(12) United States Patent
Wang

(10) Patent No.: US 10,344,857 B2
(45) Date of Patent: Jul. 9, 2019

(54) GEAR-LEVER MECHANISM USING MESHING AND PUSHING TO ROTATE

(71) Applicant: Zhilin Wang, Taicang (CN)

(72) Inventor: Zhilin Wang, Taicang (CN)

( * ) Notice: Subject to any disclaimer, the term of this patent is extended or adjusted under 35 U.S.C. 154(b) by 45 days.

(21) Appl. No.: 15/548,412

(22) PCT Filed: Feb. 2, 2016

(86) PCT No.: PCT/CN2016/073235
§ 371 (c)(1),
(2) Date: Aug. 2, 2017

(87) PCT Pub. No.: WO2016/124134
PCT Pub. Date: Aug. 11, 2016

(65) Prior Publication Data
US 2018/0038479 A1    Feb. 8, 2018

(30) Foreign Application Priority Data

Feb. 3, 2015    (CN) .......................... 2015 1 0066866

(51) Int. Cl.
*F16H 3/00* (2006.01)
*F16H 63/06* (2006.01)
(Continued)

(52) U.S. Cl.
CPC ............. *F16H 63/067* (2013.01); *F16H 1/32* (2013.01); *F16H 1/36* (2013.01); *F16H 3/002* (2013.01); *F16H 59/14* (2013.01)

(58) Field of Classification Search
CPC . F16H 3/002; F16H 3/005; F16H 3/56; F16H 3/58; F16H 59/14; F16H 63/067
See application file for complete search history.

(56) References Cited

U.S. PATENT DOCUMENTS 7,588,511 B2 * 9/2009 Tangl ..................... B60K 6/365
                                                          475/150

FOREIGN PATENT DOCUMENTS

CN          1743704 A       3/2006
CN        101482467 A       7/2009
(Continued)

OTHER PUBLICATIONS

International Search Report and Written Opinion (English Translation); PCT/CN2016/073235, (3 pages) dated Apr. 26, 2016.

*Primary Examiner* — Mark J Beauchaine
(74) *Attorney, Agent, or Firm* — Renaissance IP Law Group, LLP; David A. Crowther

(57) ABSTRACT

A gear-lever mechanism using meshing and pushing for rotation includes a shell; an input device including a driving gear; an output device including a supporting frame and a driven gear set; and a positioning device including a fixed bearing gear. The driven gear set includes a transfer-layer gear and at least one idler gear. The supporting shaft center of each transmission gear in the driven gear set is the sub-bearing point, with each transmission gear meshed with its adjacent drive gears to form two meshing points. The bearing point and the two meshing points form a triangular pushing area. At least two triangular pushing areas in head-to-tail connection form a meshing-pushing-lever-type torsion-output path curved from the driving gear to the fixed bearing gear for connecting and driving, to cause the gear set to rotate with a raising speed, and then reduce the speed and increase the torque.

42 Claims, 32 Drawing Sheets

(51) Int. Cl.
    *F16H 1/32*           (2006.01)
    *F16H 59/14*         (2006.01)
    *F16H 1/36*           (2006.01)

(56)     References Cited

FOREIGN PATENT DOCUMENTS

| | | |
|---|---|---|
| CN | 201351712 | 11/2009 |
| CN | 204805491 U | 11/2015 |
| DE | 202009005197 U1 | 1/2010 |
| GB | 189616511 A | 7/1897 |

* cited by examiner

GEAR-LEVER MECHANISM USING MESHING AND PUSHING TO ROTATE

TECHNICAL FIELD

This disclosure relates to the field of mechanical transmission devices, and particularly to a gear-lever mechanism using meshing and pushing to rotate (a gear-lever mechanism using meshing and pushing for rotation).

BACKGROUND

In the field of mechanical transmission, gears are widely used. When the gears are meshed with each other to transmit speed and torsion, if a main gear drives a pinion, a rotating speed of the pinion will be increased, but driving force given by the main gear is greater than output force of the pinion; if the pinion is used to drive the main gear, a rotating speed of the main gear will be reduced, but driving force given by the pinion is less than output force of the main gear. So if it is desired to maintain a relatively high torsion, the rotating speed needs to be reduced correspondingly. A common technology is reducing the speed and increasing the torque. Persons skilled in the mechanical industry generally desire to improve the transmission efficiency of the existing gears, with main approaches of: 1) improving the accuracy; and 2) decreasing the friction of gear meshing.

SUMMARY

Embodiments of the present invention include a transmission mode of using meshing and pushing, with the transmission from a gear to another gear reduced, so as to push a main gear set to rotate in a forward direction or a reverse direction at an increasing speed through a relatively small driving gear, wherein when the driving gear rotates by one turn, the driven gear set rotates 1 to over 96.67 turns, then the speed is reduced and the torsion is increased.

Embodiments of the present invention include increasing the torsion by designing an arrangement of idler gears to form a level-type thrust angle, and setting a tooth number proportion according to a ratio of an output speed to an input speed, to achieve effective torsion increase by pushing force.

In order to solve the above technical problems, one technical solution employed in various embodiments of the present invention is as follows: a gear-lever mechanism using meshing and pushing for rotation, comprising:

a shell, an input device, an output device and a positioning device housed by the shell, wherein the input device comprises at least one driving gear rotatably provided;

the output device comprises at least one supporting frame in which several supporting shafts are disposed to support at least one movably rotatable driven gear set;

the positioning device comprises at least one fixed bearing gear configured to form a rotational bearing point during rotation of the output device and be fixed by the shell;

the driven gear set comprises a transfer-layer gear and at least one idler gear;

the transfer-layer gear comprises an upper transfer-layer gear part and a lower transfer-layer gear part, total tooth number of the upper transfer-layer gear part and the driving gear is M, total tooth number of the lower transfer-layer gear part and the fixed bearing gear is N, and M and N are configured to be unequal;

the at least one idler gear or the transfer-layer gear meshed with the fixed bearing gear is configured to rotate in a direction same with the supporting frame at an increasing speed;

the driving gear is meshed with the upper transfer-layer gear part directly or through the each of the at least one idler gear, and the lower transfer-layer gear part is meshed with the fixed bearing gear directly or through the idler gear, such that the driven gear set is able to perform planetary meshing-pushing rotation around the fixed bearing gear under driving by the driving gear, and to drive, through the supporting shafts, the supporting frame to rotate at an increasing speed;

a diameter of a movement trail formed by an axial center of an outermost supporting shaft when rotating along with the supporting frame is not less than 1.2 times of a diameter of the driving gear;

a meshing point between the driving gear and the idler gear or the transfer-layer gear is set as a driving point, a meshing point between the idler gear or the transfer-layer gear and the fixed bearing gear is set as a bearing point, and an intersection point formed by the supporting frame and the axial center of the outmost supporting shaft is set as an output force point; and an axial center of the supporting shaft of each of driven gears in the driven gear set of the output device is a sub-bearing point, wherein each of the driven gears is meshed with the adjacent driven gears to respectively form two meshing points, the bearing point and the two meshing points form a triangular pushing area, and at least two triangular pushing areas connected from head to tail form a meshing-pushing-lever-type torsion output path from the driving gear to the fixed bearing gear for connection in a bent form and driving.

The supporting frame is configured to support at least two movably rotatable driven gear sets by several supporting shafts, with the at least two driven gear sets being disposed axially symmetrically with respect to the driving gear.

The supporting frame is configured to support at least three movably rotatable driven gear sets by several supporting shafts, with the driven gear sets being disposed centrally symmetrically with respect to the supporting shaft of the driving gear.

Each of the driven gear sets comprises an even number of idler gears. Further, the idler gears are in number of two, four, six or eight. Each of the driven gear sets comprises an odd number of idler gears. Further, the idler gears are in number of one, three, five or seven. Each of the driven gear sets is provided with at least one transfer-layer (layer-transferring) gear. Further, each of the driven gear sets is provided with at least two transfer-layer gears.

Tooth number of the upper transfer-layer gear part is configured to be equal to tooth number of the lower transfer-layer gear part, and tooth number of the driving gear is configured to be unequal to tooth number of the fixed bearing gear. Tooth number of the upper transfer-layer gear part is configured to be unequal to tooth number of the lower transfer-layer gear part, and tooth number of the driving gear is configured to be equal to tooth number of the fixed bearing gear. Tooth number of the upper transfer-layer gear part is configured to be unequal to tooth number of the lower transfer-layer gear part, and tooth number of the driving gear is configured to be unequal to tooth number of the fixed bearing gear.

A difference between the tooth number of the upper transfer-layer gear part and the tooth number of the lower transfer-layer gear part is at least two. A difference between the tooth number of the upper transfer-layer gear part and the tooth number of the lower transfer-layer gear part is four, six, eight, twelve or at least eighteen. A difference between the tooth number of the driving gear and the tooth number of the fixed bearing gear is at least two. A difference between the tooth number of the driving gear and the tooth number of the fixed bearing gear is at least four, six, eight, twelve or at least eighteen.

The several idler gears are arranged in a same layer. The several idler gears are not provided in a same layer. The meshing-pushing-lever-type power output path is in an involute, arcuate or polyline shape. The output device and the driving gear are configured to rotate in a same direction when a sum of the tooth number of the upper transfer-layer gear part and the tooth number of the driving gear is larger than a sum of the tooth number of the lower transfer-layer gear part and the tooth number of the fixed bearing gear; and the output device and the driving gear are configured to rotate in reverse directions when the sum of the tooth number of the upper transfer-layer gear part and the tooth number of the driving gear is smaller than the sum of the tooth number of the lower transfer-layer gear part and the tooth number of the fixed bearing gear.

The idler gear is disposed between the driving gear and the transfer-layer gear or disposed only between the transfer-layer gear and the fixed bearing gear. The output device further comprises an inner gear ring meshed with the transfer-layer gear or the idler gear. The driving gear, the idler gear, the transfer-layer gear, or the fixed bearing gear includes a herringbone gear, a bevel gear, a modified gear, an involute gear, a triangular gear, a helical gear, or a spiral gear. The driving gear is a roller gear. The positioning device is set as a fixed gear ring. At least two triangular pushing areas are formed in one of the driven gear sets. Further, the formed triangular pushing areas are in number of two, three, four, five, six or seven.

A vertex angle of the triangular pushing area to which the sub-bearing point belongs is less than or equal to 170 degrees. Further, the vertex angle of the triangular pushing area to which the sub-bearing point belongs is less than or equal to 120 degrees. Further, the vertex angle of the triangular pushing area to which the sub-bearing point belongs is between 25 degrees and 60 degrees.

The gear-lever mechanism using meshing and pushing for rotation comprises two or more gear-lever mechanisms each configured to achieve transmission by a reduction gear mechanism. A plurality of gear-lever mechanisms are disposed coaxially concentrically in series in a vertical direction. A plurality of gear-lever mechanisms are in staggered arrangement in a vertical direction. The shells of the plurality of gear-lever mechanisms are disposed in one piece.

A first straight line is formed from an axial center of the driving gear to the driving point, a second straight line is formed from an axial center of the fixed bearing gear to the bearing point, and an angle between the first straight line and the second straight line forms a thrust angle which is of 30 degrees to 220 degrees. The thrust angle is of 59 degrees to 135 degrees. The thrust angle is of 73 degrees to 92 degrees. At least one end portion of the supporting shaft is provided with a rotatable part. The supporting shaft is fixedly connected in the supporting frame, and the idler gear and the transfer-layer gear in the driven gear set are rotatably sheathed on the supporting shaft.

The supporting shaft is embodied as a shaft-like protrusion protruding from an inner side of the supporting frame. The supporting shaft is a shaft connected with the supporting frame. The rotatable part includes a cylindrical roller bearing, a tapered roller bearing, a ball bearing or a sliding sleeve.

The gear-lever mechanism using meshing and pushing for rotation of the present invention has beneficial effects as follows:

1) By forming a thrust angle though the driving gear, the driven gear set and the positioning device, and by cooperating with a driven gear having a small center to drive the supporting frame to rotate, the gear transmission efficiency is improved.

2) By providing a positioning device, the gears can be made to autorotate and the gear-level mechanism can perform outputting in the same direction at an increasing speed.

3) By providing the idler gear and making the idler gear to form level reinforcing together with the positioning device and the transfer-layer gear, the gear transmission efficiency is improved.

4) By providing a plurality of idler gears in arc arrangement, the gears in continuous meshing may form multiple continuous triangular pushing areas, generating continuous pushing effect and improving the power transmission efficiency of the gear set.

5) By providing the gear-level mechanisms using meshing and pushing for rotation superposed in multiple layers, the output rotational speed is doubly increased, and by providing a reduction gear mechanism at an input end or an output end, the torsion output is increased.

The gear-lever mechanism of the present invention can be mounted on or connected to a manual machine or a power machine for driving of vehicles, ships and airplanes, power generation or other circumstances where power output is needed.

BRIEF DESCRIPTION OF THE DRAWINGS

In order to more clearly illustrate technical solutions of examples of the present invention, figures which are needed for description of the examples will be introduced briefly below. The figures in the following description merely show some examples of the present invention. A person ordinarily skilled in the art still can obtain other figures according to these figures, without contributing inventive effort. In the figures.

Figure 1:
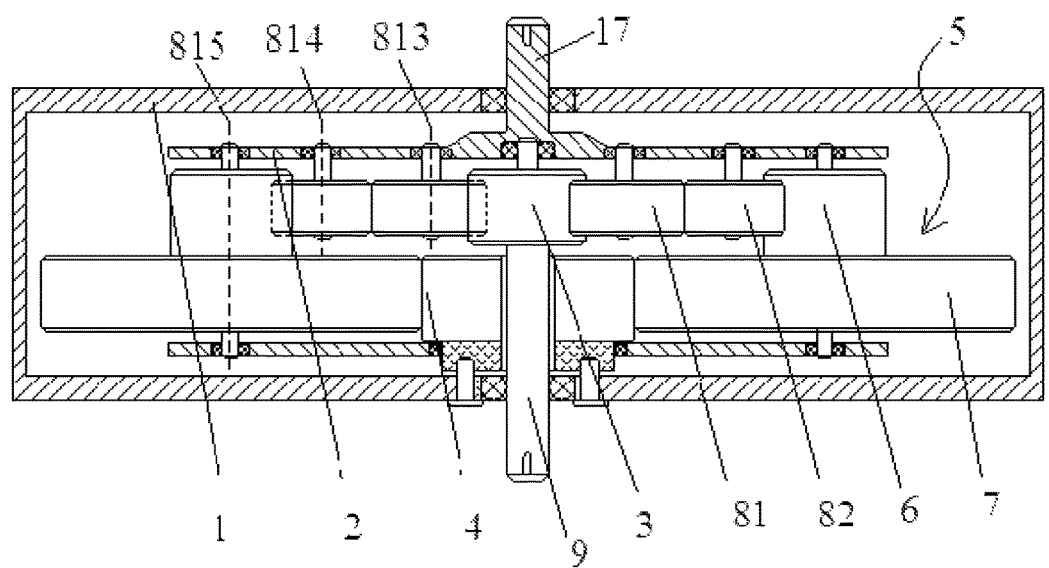
FIG. 1 is a side sectional view of a gear-lever mechanism using meshing and pushing for rotation in an embodiment of the present invention.

Reference signs of various components in the figures may refer to the following: A: upper-layer transmission structure, B: lower-layer transmission structure, 1: shell, 2: supporting frame, 2': sub-supporting frame, 2-1: upper supporting frame, 2-2: lower supporting frame, 3: driving gear, 3': sub-driving gear, 31: third driving gear, 32: first driving gear, 33: roller gear, 4: fixed bearing gear, 4': sub-fixed bearing gear, 42: second driving gear, 43: fixed gear ring, 5: transfer-layer gear, 5b: fourth output path, 51: second transfer-layer gear part, 6: upper transfer-layer gear part, 6': sub-upper transfer-layer gear part, 61: first upper transfer-layer gear part, 62: second upper transfer-layer gear part, 7: lower transfer-layer gear part, 7': lower transfer-layer gear part, 71: first lower transfer-layer gear part, 72: second lower transfer-layer gear part, 8A: axial center of outmost supporting shaft, 8B: movement trail, 81: first idler gear, 81': sub-first idler gear, 811: first sub-bearing point, 81a: first triangular pushing area, 81b: first output path, 82: second idler gear, 82': sub-section idler gear, 822: second sub-bearing point, 82a: second triangular pushing area, 82b: second output path, 83: third idler gear, 83b: third output path, 83a: third triangular pushing area, 84: fourth idler gear, 84a: fourth triangular pushing area, 84b: fifth output path, 85: fifth idler gear, 85a: fifth triangular pushing area, 86: sixth idler gear, 813: first idler gear supporting shaft, 814: second idler gear supporting shaft, 815: transfer-layer gear supporting shaft, 9: input shaft, 10: output gear ring, 11: gear ring, 13: motor, 14: electric generator, 15: main gear, 16: side input gear, 17: output shaft, 18: first reduction gear, 18': third reduction gear, 19: second reduction gear, 19': fourth reduction gear, 20: first bearing, 20-1: second bearing, 20-2: third bearing, I: axial center of first input shaft, II: axial center of second input shaft.

DETAILED DESCRIPTION OF THE EMBODIMENTS

Below, technical solutions of the examples of the present invention will be described clearly and completely. Some but not all of the examples of the present invention are described. Based on the examples of the present invention, all the other examples, which a person ordinarily skilled in the art obtains without using inventive effort, fall within the scope of protection of the various embodiments of the present invention.

The gear-lever mechanism using meshing and pushing for rotation includes: a shell 1, and an input device, an output device, and a positioning device housed in the shell 1. The input device includes at least one driving gear 3 rotatably provided. The output device includes at least one supporting frame 2, the supporting frame 2 being provided with several supporting shafts for supporting at least one movably rotatable driven gear set. The positioning device includes at least one fixed bearing gear 4 forming a rotational bearing during a rotating process of the output device and fixed by the shell 1. The driven gear set includes a transfer-layer gear 5 and at least one idler gear. The transfer-layer gear 5 includes an upper transfer-layer gear part 6 and a lower transfer-layer gear part 7, with the total tooth number of the upper transfer-layer gear part 6 and the driving gear 3 being M, the total tooth number of the lower transfer-layer gear part 7 and the fixed bearing gear 4 being N, and M and N being unequal. The idler gear or the transfer-layer gear 5 meshed with the fixed bearing gear 4 rotates in a same direction as the supporting frame 2. The driving gear 3 is meshed with the upper transfer-layer gear part 6 directly or through the idler gear, and the lower transfer-layer gear part 7 is meshed with the fixed bearing gear 4 directly or through the idler gear, so that the driven gear set, as being driven by the driving gear 3, can perform planetary meshing-pushing rotation around the fixed bearing gear 4, and can drive the supporting frame 2 through the supporting shafts to rotate with a raising speed.

A diameter of a movement trail formed by an axial center of an outmost supporting shaft when rotating along with the supporting frame 2 is no less than 1.2 times of a diameter of the driving gear 3. A meshing point between the driving gear 3 and the idler gear or the upper transfer-layer gearing 5 is taken as a driving point, a meshing point between the idler gear or the transfer-layer gear 5 and the fixed bearing gear 4 is taken as a bearing point, and an intersection point formed by the supporting frame 2 and the axial center of the outmost supporting shaft is taken as an output force point. An axial center of a supporting shaft of each drive gear in the driven gear set of the output device is a sub-bearing point, wherein each drive gear is meshed with its adjacent drive gears to respectively form two meshing points. The bearing point and the two meshing points form a triangular pushing area. At least two triangular pushing areas connected from head to tail form one meshing-pushing lever type torsion output path from the driving gear 3 to the fixed bearing gear 4 for connection in a bent form and driving.

The gear-lever mechanism of the present invention can be mounted on or connected to a manual machine or a power machine for driving of vehicles, ships, and airplanes, power generation or other circumstances where power output is needed.

Example 1

Figure 2:
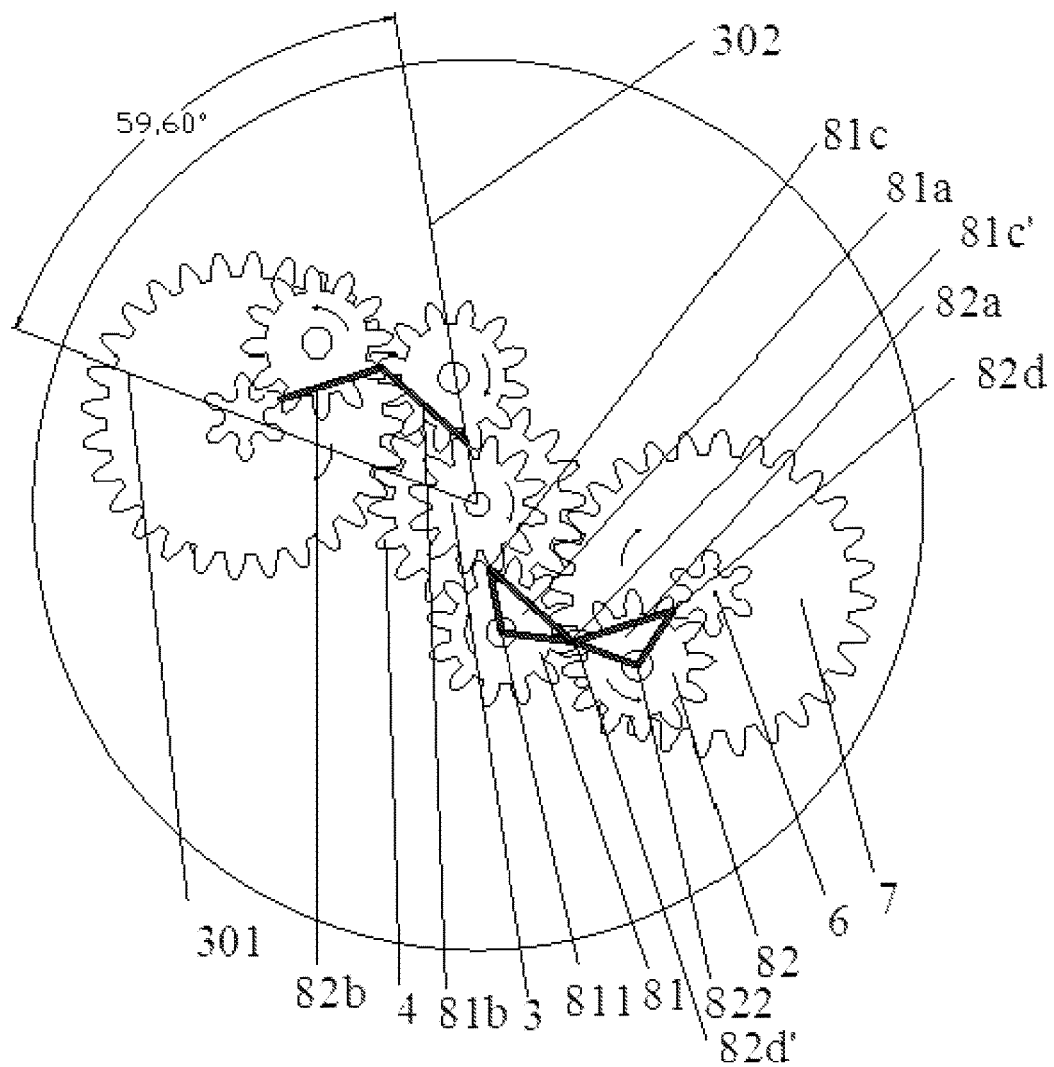
FIG. 2 is a top view of a gear-lever mechanism using meshing and pushing for rotation in an embodiment of the present invention.

As shown in FIG. 1 and FIG. 2, a gear-lever mechanism using meshing and pushing for rotation includes a shell 1, a supporting frame 2, a driving gear 3, a fixed bearing gear 4, a transfer-layer gear 5, a first idler gear 81, and a second idler gear 82. The supporting frame 2 is provided inside the shell 1. The supporting frame 2 and the shell 1 are rotatable relative to each other. The supporting frame 2 and the fixed bearing gear 4 are coaxially arranged. The supporting frame 2 is sleeved on the fixed bearing gear 4, and the supporting frame 2 is rotatable around a shaft of the fixed bearing gear 4. An input device further includes one input shaft 9 in rigid connection with the driving gear 3. One end of the fixed bearing gear 4 is fixedly connected to the shell 1. The driving gear 3 is connected with the input shaft 9. The first idler gear 81 and the second idler gear 82 are arranged at outside of the driving gear 3, and the driving gear 3 drives an upper transfer-layer gear part 6 of the transfer-layer gear 5 through the first idler gear 81 and the second idler gear 82. The transfer-layer gear 5 includes the upper transfer-layer gear part 6 and a lower transfer-layer gear part 7 which are coaxially connected. The upper transfer-layer gear part 6 and the lower transfer-layer gear part 7 move synchronously. The lower transfer-layer gear part 7 of the transfer-layer gear 5 is meshed with the fixed bearing gear 4. The first idler gear 81 is fixed on the supporting frame 2 through a first idler gear supporting shaft 813, the second idler gear 82 is fixed on the supporting frame 2 through a second idler gear supporting shaft 814, and the transfer-layer gear 5 is fixed on the supporting frame 2 through a transfer-layer gear supporting shaft 815.

An output shaft 17 is coaxially connected with the supporting frame 2, and an input torque is output through the output shaft 17 connected with the supporting frame 2. It should be noted that the tooth number of the upper transfer-layer gear part 6 of the transfer-layer gear 5 is not equal to the tooth number of the lower transfer-layer gear part 7, and a sum of the tooth number of the upper transfer-layer gear part 6 and the driving gear 3 is not equal to a sum of the tooth numbers of the lower transfer-layer gear part 7 and the fixed bearing gear 4.

As a preferred example, a diameter of the upper transfer-layer gear part 6 is smaller than a diameter of the lower transfer-layer gear part 7. Thus, the tooth number of the upper transfer-layer gear part 6 is smaller than the tooth number of the lower transfer-layer gear part 7.

The driving gear 3 is driven by the input shaft 9, and drives the first idler gear 81, the second idler gear 82, and the transfer-layer gear 5 and finally transmits the force to the fixed bearing gear 4. Since the fixed bearing gear 4 is fixed, autorotation of the fixed bearing gear 4 is restricted, and the transfer-layer gear 5 meshed with the fixed bearing gear 4 cannot rotate freely, and is forced to perform meshing-pushing rotation along the circumference of the fixed bearing gear 4, and meanwhile pushes the supporting frame 2 to move. Since the tooth number of the transfer-layer gear 5 or of the driving gear 3 is different from that of the fixed bearing gear 4, when the driving gear 3 is rotated by a certain angle, due to the difference between the tooth number of the upper transfer-layer gear part 6 of the transfer-layer gear 5 and that of the lower transfer-layer gear part 7, the angle by which the transfer-layer gear 5 is rotated on the fixed bearing gear 4 is greater than the angle by which the driving gear 3 is rotated, that is, the rotating angle of the supporting frame 2 is greater than the rotating angle of the driving gear 3.

Meanwhile, since the supporting frame 2 is rotated, all of the first idler gear 81, the second idler gear 82 and the transfer-layer gear 5 fixed on the supporting frame 2 perform revolution movement; moreover, when each gear performs the revolution movement, a linear speed at which an axial center of the gear are rotated around the positioning device is equal to a peripheral speed of autorotation of the gears. Since the rotating angle of the driving gear 3 is magnified through the difference of tooth numbers of the upper transfer-layer gear part 6 and the lower transfer-layer gear part 7 of the transfer-layer gear 5, the angular speed of the rotation of the supporting frame 2 is greater than the angular speed of the rotation of the driving gear 3. Moreover, the idler gears and the fixed bearing gear 4 are fixed at periphery of the driving gear 3, such that the autorotation speeds of the idler gears and the transfer-layer gear 5 are raised, finally forming the meshing-pushing rotation.

The gears (for example, the idler gears, the driving gear, the transfer-layer gear, and the fixed bearing gear) of the gear-lever transmission mechanism can be made by double-helical gears, bevel gears, modified gears, involute gears, triangular gears, helical gears, and spiral gears, without limiting thereto.

Speed ratio=output rotational speed: input rotational speed=the tooth number of the lower transfer-layer gear part 7\*the tooth number of the driving gear 3/(the tooth number of the lower transfer-layer gear part 7\*the tooth number of the driving gear 3–the tooth number of the upper transfer-layer gear part 6\*the tooth number of the fixed bearing gear 4).

A sum of the tooth number of the upper transfer-layer gear part 6 and the tooth number of the lower transfer-layer gear part 7 is not equal to a sum of the tooth number of the driving gear 3 and the tooth number of the fixed bearing gear 4. The driven gear set performs the meshing-pushing rotation around the driving gear 3 and the fixed bearing gear 4, forming combined movement of autorotation and revolution.

As a more preferred embodiment, taking the driving gear 3 as a center, at least two driven gear sets constituted by the idler gear and the transfer-layer gear 5 are arranged in array, and the upper transfer-layer gear parts 6 of the transfer-layer gears 5 in array simultaneously perform planetary meshing-pushing rotation at a periphery of the fixed bearing gear 4, forming at least meshing-pushing lever type two power output paths for outward outputting. For example, two, three or four driven gear sets each comprising the first idler gear 81, the second idler gear 82, and the transfer-layer gear 5 are formed in array, all of the plurality of gear sets are arranged to be centrosymmetrical with respect to the fixed bearing gear 4. The upper transfer-layer gear parts 6 of the transfer-layer gears 5 simultaneously perform planetary meshing-pushing rotation at the outer ring of the fixed bearing gear 4, forming at least two power output paths of meshing-pushing lever type with outward output.

As a preferred solution, the idler gear can be arranged between the fixed bearing gear 4 and the lower transfer-layer gear part 7. Particularly, in the present example, the diameter of the upper transfer-layer gear part 6 is smaller than the diameter of the lower transfer-layer gear part 7, and the output device rotates in the direction same with the driving gear 3 at a raising speed.

In the above example, a meshing point between the driving gear 3 and the first idler gear 81 is taken as a driving point, a meshing point between the lower transfer-layer gear part 7 and the fixed bearing gear 4 is taken as a bearing point, and an intersection point between an axial center point of the transfer-layer gear and the supporting frame is taken as an output force point.

An axial center of a first idler gear supporting shaft 813 of the first idler gear 81 is a first sub-bearing point 811. There are two meshing points (i.e. a meshing point 81$c$ and a meshing point 81$c'$) between the first idler gear 81 and the driving gear 3, and between the first idler gear and the second idler gear 82. The first sub-bearing point 811, the meshing point 81$c$, and the meshing point 81$c'$ form a first triangular pushing area 81$a$. A connecting line from the meshing point 81$c$ to the meshing point 81$c'$ defines a first output path 81$b$. An axial center of a second idler gear supporting shaft 814 of the second idler gear 82 is a second sub-bearing point 822. A meshing point 82$d'$ is present between the second idler gear 82 and the first idler gear 81, and a meshing point 82$d$ is present between the second idler gear and the upper transfer-layer gear part 6. The second sub-bearing point 822 and two meshing points (the meshing point 82$d$ and the meshing point 82$d'$) form a second triangular pushing area 82$a$. The meshing point 82$d$ and the meshing point 82$d'$ define a second output path 82$b$.

The first output path 81$b$ and the second output path 82$b$ are connected in continuity, and define one meshing-pushing-lever-type torsion output path from the driving gear 3 to the fixed bearing gear 4 for connection in a bent form and driving.

In the above example, the tooth number of the driving gear 3 is 12, the tooth number of the fixed bearing gear 4 is 18, the tooth number of the upper transfer-layer gear part 6 is 6, and the tooth number of the lower transfer-layer gear part 7 is 28. At this time, when the input is rotated by one turn, the output is rotated by 1.47 turns, that is, when the input is rotated by one turn, the output is rotated, realizing speed rising.

The meshing point between the driving gear 3 and the first idler gear 81 is a driving point. The meshing point between the transfer-layer gear 5 and the fixed bearing gear 4 is a bearing point. A connecting line from the axial center of the driving gear 3 to the driving point is a first straight line 301. A connecting line from the axial center of the fixed bearing gear 4 to the bearing point is a second straight line 302. An angle defined between the first straight line 301 and the second straight line 302 is a thrust angle. The thrust angle is of 30-220°, preferably 59.6° in the present solution.

Figure 3:
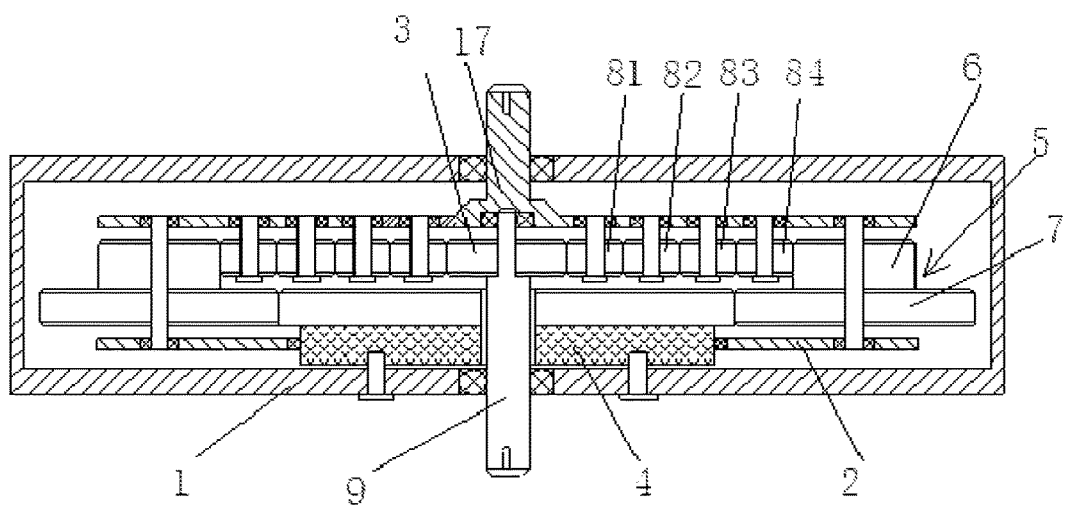
FIG. 3 is a side sectional view of a gear-lever mechanism using meshing and pushing for rotation in an embodiment of the present invention wherein a driven gear set is provided with four idler gears.
Figure 4:
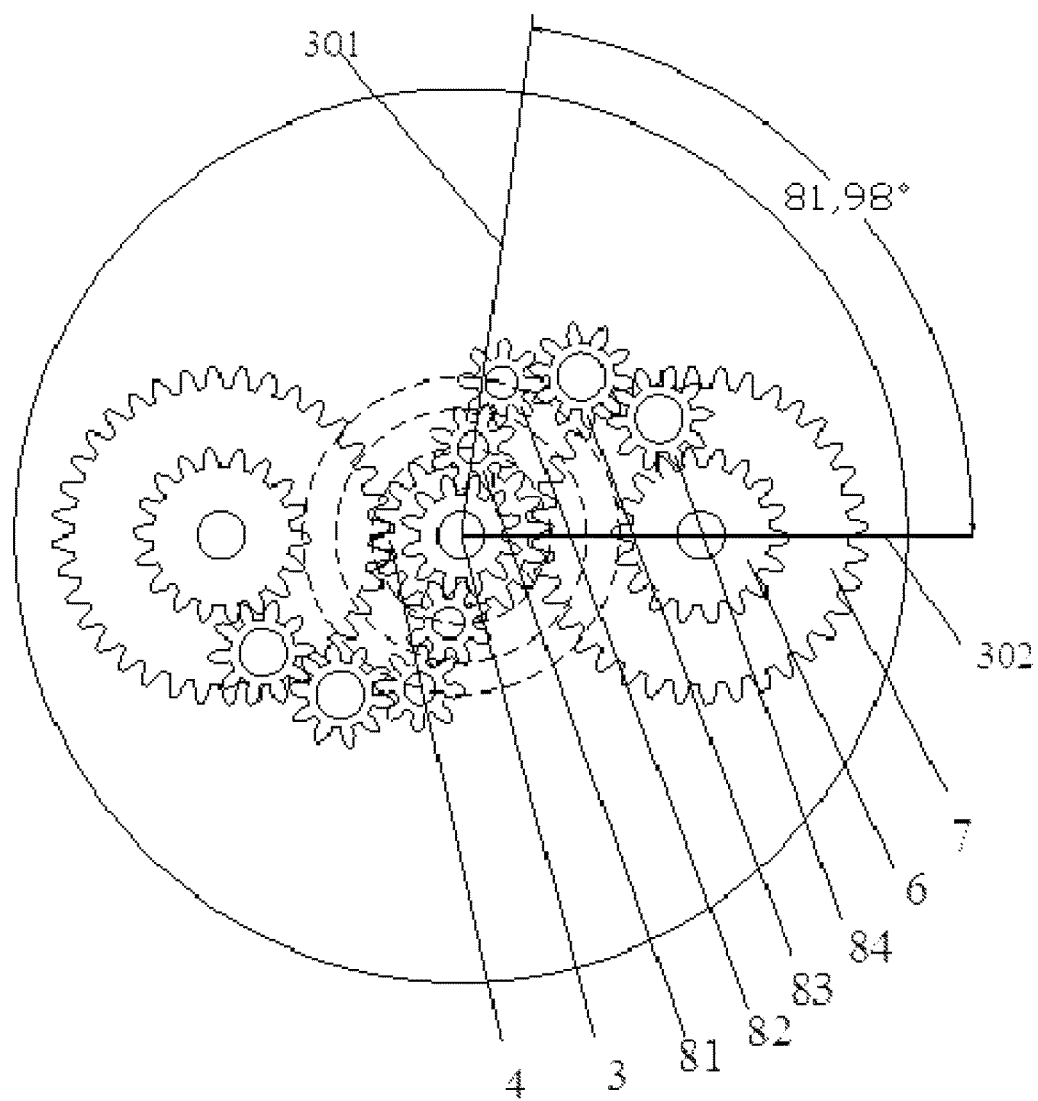
FIG. 4 is a top view of a gear-lever mechanism using meshing and pushing for rotation in an embodiment of the present invention where a driven gear set is provided with four idler gears.

Referring to FIG. 3 and FIG. 4, in one preferred solution of the present invention, each driven gear set is provided with 4 idler gears, i.e. the first idler gear 81, the second idler gear 82, the third idler gear 83, and the fourth idler gear 84. The four idler gears are arranged in an arc shape outwardly along the circumference of the driving gear 3 and meshed in turn, so that the driving gear 3 can drive the transfer-layer gear 5 through the idler gears.

The meshing point between the driving gear 3 and the first idler gear 81 is a driving point. The meshing point between the transfer-layer gear 5 and the fixed bearing gear 4 is a bearing point. A connecting line from the axial center of the driving gear 3 to the driving point is a first straight line 301. A connecting line from the axial center of the fixed bearing gear 4 to the bearing point is a second straight line 302. An angle defined between the first straight line 301 and the second straight line 302 is a thrust angle. The thrust angle is of 30-220°, preferably 81.98° in the present solution.

In the present solution, the tooth number of the driving gear 3 is 12, the tooth number of the fixed bearing gear 4 is 18, the tooth number of the upper transfer-layer gear part 6 is 18, and the tooth number of the lower transfer-layer gear part 7 is 36. At this time, when the input is rotated by one turn, the output is rotated by four turns, realizing speed rising. At this time, the meshing rotation accounts for 25%, and the pushing rotation accounts for 75%.

Figure 5:
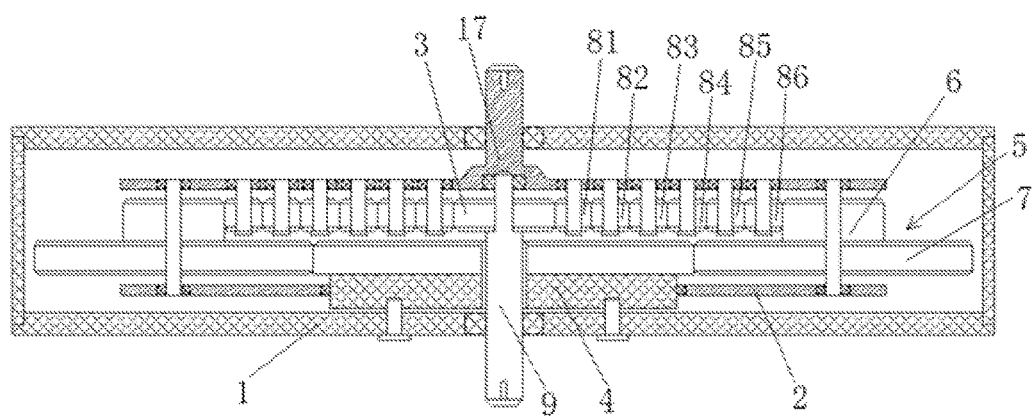
FIG. 5 is a side sectional view of a gear-lever mechanism using meshing and pushing for rotation in an embodiment of the present invention where a driven gear set is provided with six idler gears.
Figure 6:
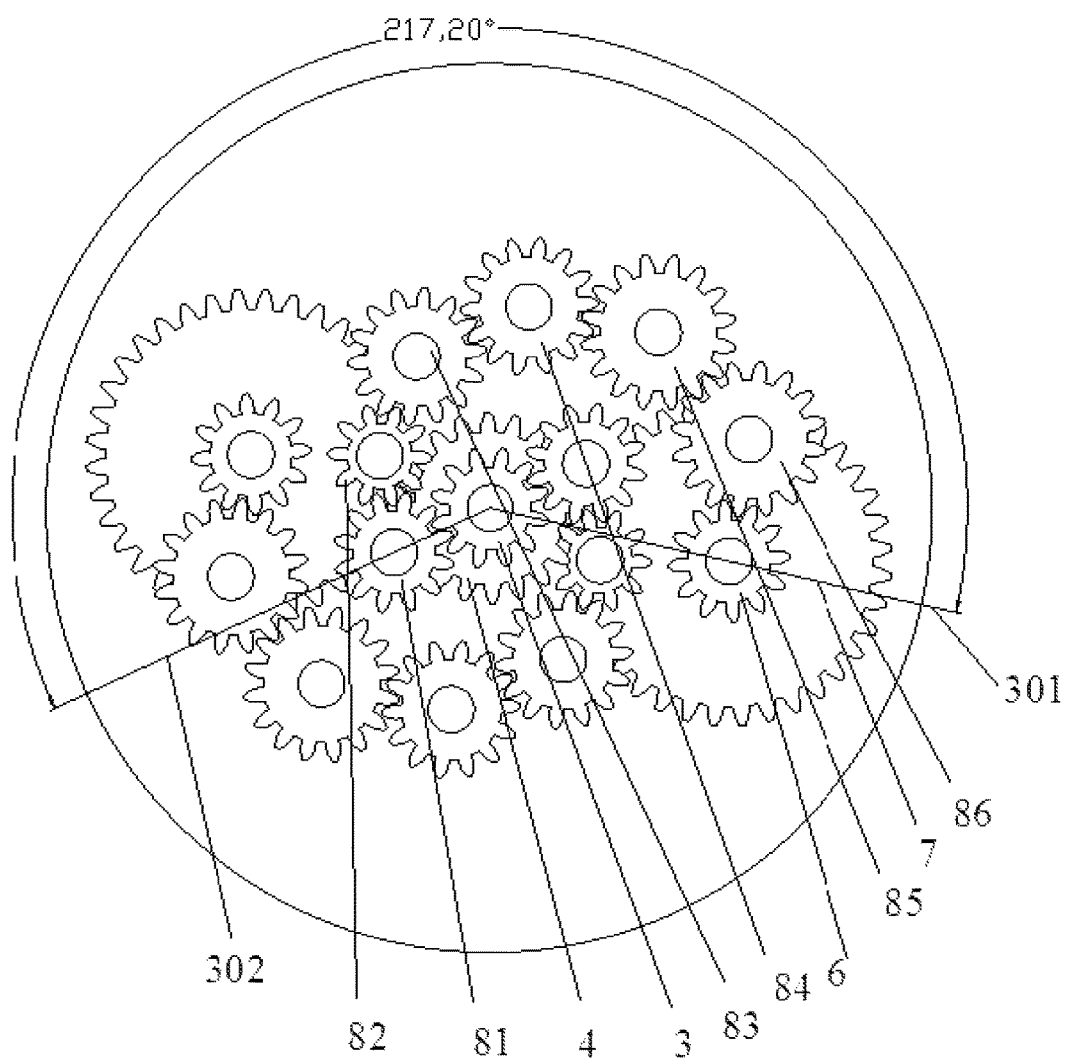
FIG. 6 is a top view of a gear-lever mechanism using meshing and pushing for rotation in an embodiment of the present invention where a driven gear set is provided with six idler gears.

Referring to FIG. 5 and FIG. 6, in one preferred solution of the present invention, each driven gear set is provided with 6 idler gears, including the first idler gear 81, the second idler gear 82, the third idler gear 83, the fourth idler gear 84, the fifth idler gear 85, and the sixth idler gear 86. The six idler gears are arranged in an arc shape outwardly along the circumference of the driving gear 3 and meshed in turn, so that the driving gear 3 can drive the transfer-layer gear 5 through the idler gears.

The meshing point between the driving gear 3 and the first idler gear 81 is a driving point. The meshing point between the transfer-layer gear 5 and the fixed bearing gear 4 is a bearing point. A connecting line from the axial center of the driving gear 3 to the driving point is a first straight line 301. A connecting line from the axial center of the fixed bearing gear 4 to the bearing point is a second straight line 302. An angle defined between the first straight line 301 and the second straight line 302 is a thrust angle. The thrust angle is of 30-220°, preferably 217.2° in the present solution.

In the present solution, the tooth number of the driving gear 3 is 12, the tooth number of the fixed bearing gear 4 is 20, the tooth number of the upper transfer-layer gear part 6 is 12, and the tooth number of the lower transfer-layer gear part 7 is 36. At this time, when the driving gear 3 is rotated by one turn, the supporting frame 2 drives the driven gear set to rotate by 2.3 turns, realizing speed rising.

Figure 13:
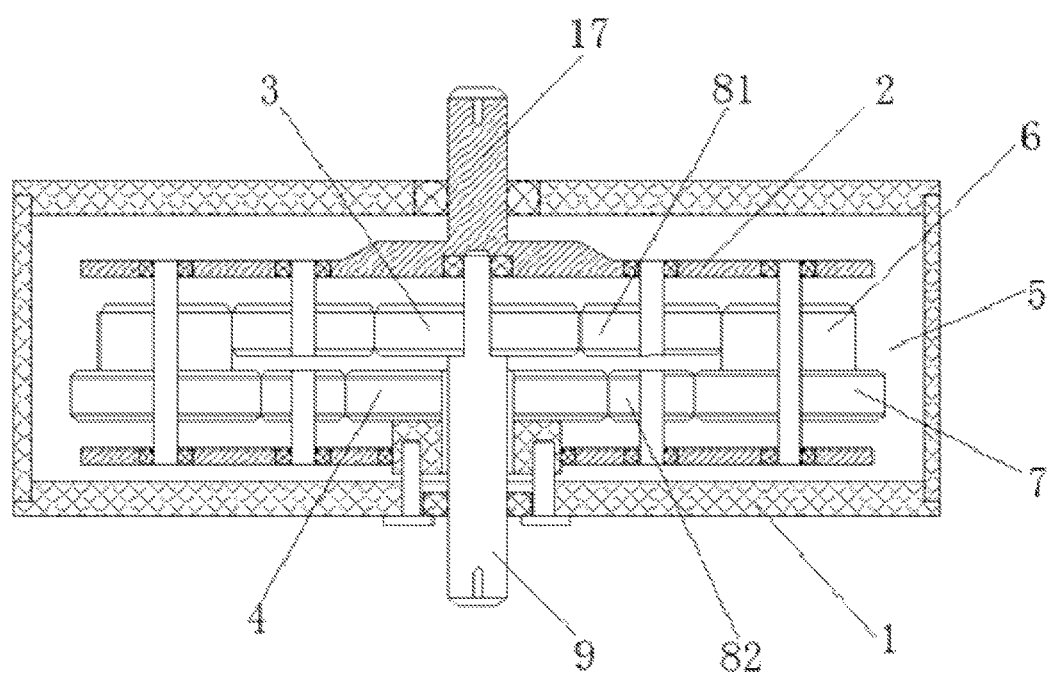
FIG. 13 is a top view of a gear-lever mechanism using meshing and pushing for rotation in an embodiment of the present invention where two idler gears in a driven gear set are provided in both upper and lower layers.
Figure 14:
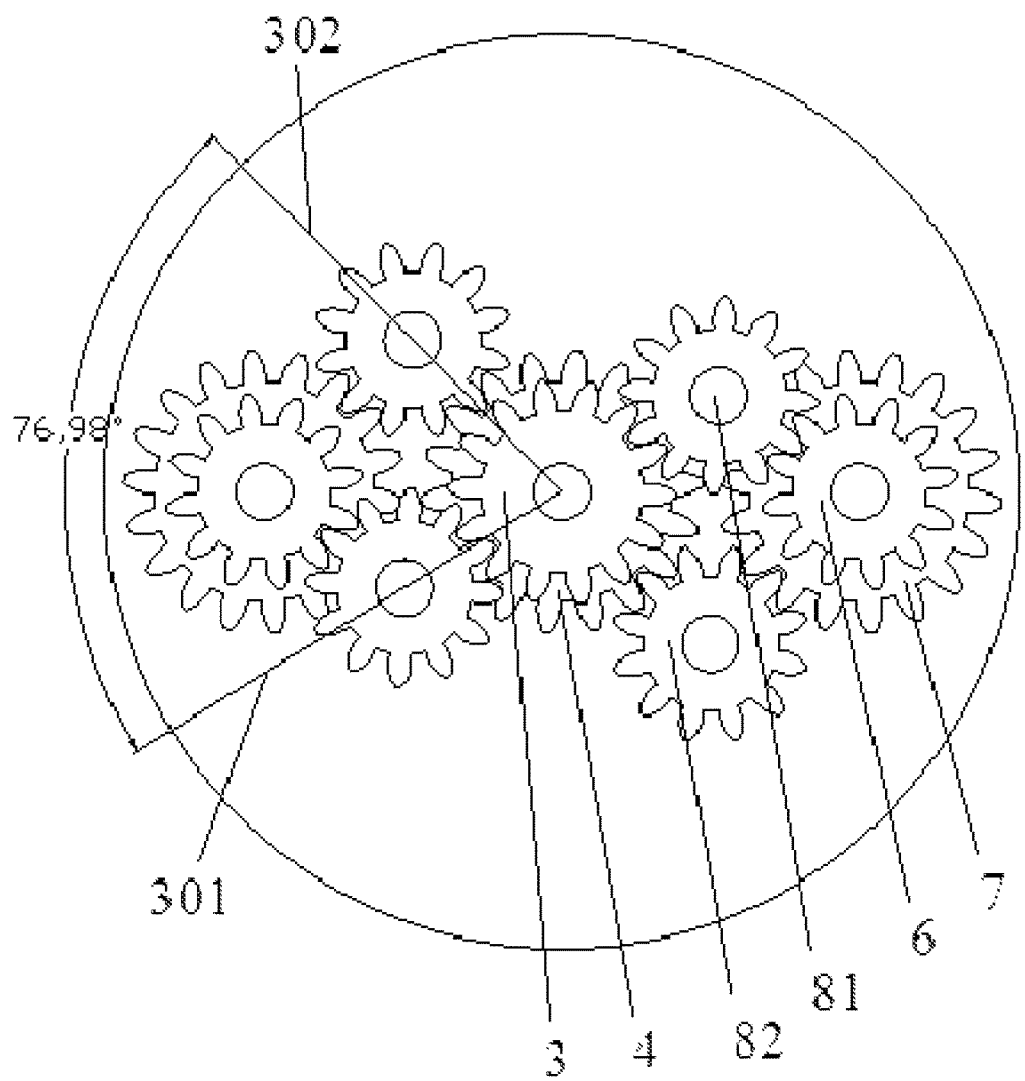
FIG. 14 is a side sectional view of a gear-lever mechanism using meshing and pushing for rotation in an embodiment of the present invention where two idler gears in a driven gear set are provided in both upper and lower layers.

Referring to FIG. 13 and FIG. 14 again, in another preferred solution of the present invention, compared with FIG. 1 and FIG. 2, an upper layer and a lower layer of the gear-lever mechanism each are provided with one idler gear, specifically, the driving gear 3 is directly connected with the upper transfer-layer gear part 6 of the transfer-layer gear 5 through the first idler gear 81, the upper transfer-layer gear part 6 coaxially and synchronously drives the lower transfer-layer gear part 7, the lower transfer-layer gear part 7 of the transfer-layer gear 5 is connected with the second idler gear 82, and the second idler gear 82 is meshed with the fixed bearing gear 4 connected with the shell 1.

The first idler gear 81, the second idler gear 82, and the transfer-layer gear 5 are arranged in a triangular shape, and the transfer-layer gear 5 is connected with the fixed bearing gear 4 and the driving gear 3 through the first idler gear 81 and the second idler gear 82.

The meshing point between the driving gear 3 and the first idler gear 81 is a driving point. The meshing point between the fixed bearing gear 4 and the second idler gear 82 is a bearing point. A connecting line from the axial center of the driving gear 3 to the driving point is a first straight line 301. A connecting line from the axial center of the fixed bearing gear 4 to the bearing point is a second straight line 302. An angle defined between the first straight line 301 and the second straight line 302 is a thrust angle. The thrust angle is of 30-220°, preferably 76.98° in the present solution.

In this solution, the tooth number of the driving gear is 14, the tooth number of the fixed bearing gear 4 is 18, the tooth number of the upper transfer-layer gear part 6 is 12, and the tooth number of the lower transfer-layer gear part 7 is 18. In this case, if the driving gear 3 rotates by one turn, the supporting frame 2 drives the driven gear set to rotate by 7 turns, namely, one turn of rotation is input and 7 turns of rotation is output, thereby achieving speed raising. At this time, the meshing rotation accounts for 14% and the pushing rotation accounts for 86%.

Figure 17:
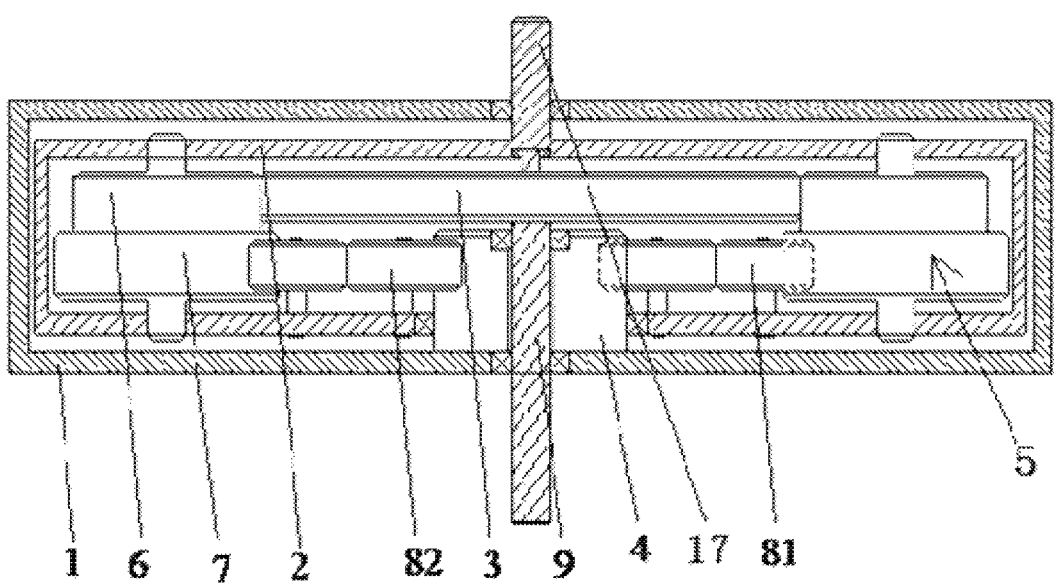
FIG. 17 is a sectional view of a gear-lever mechanism using meshing and pushing for rotation in an embodiment of the present invention, with two idler gears being configured on a lower layer.
Figure 18:
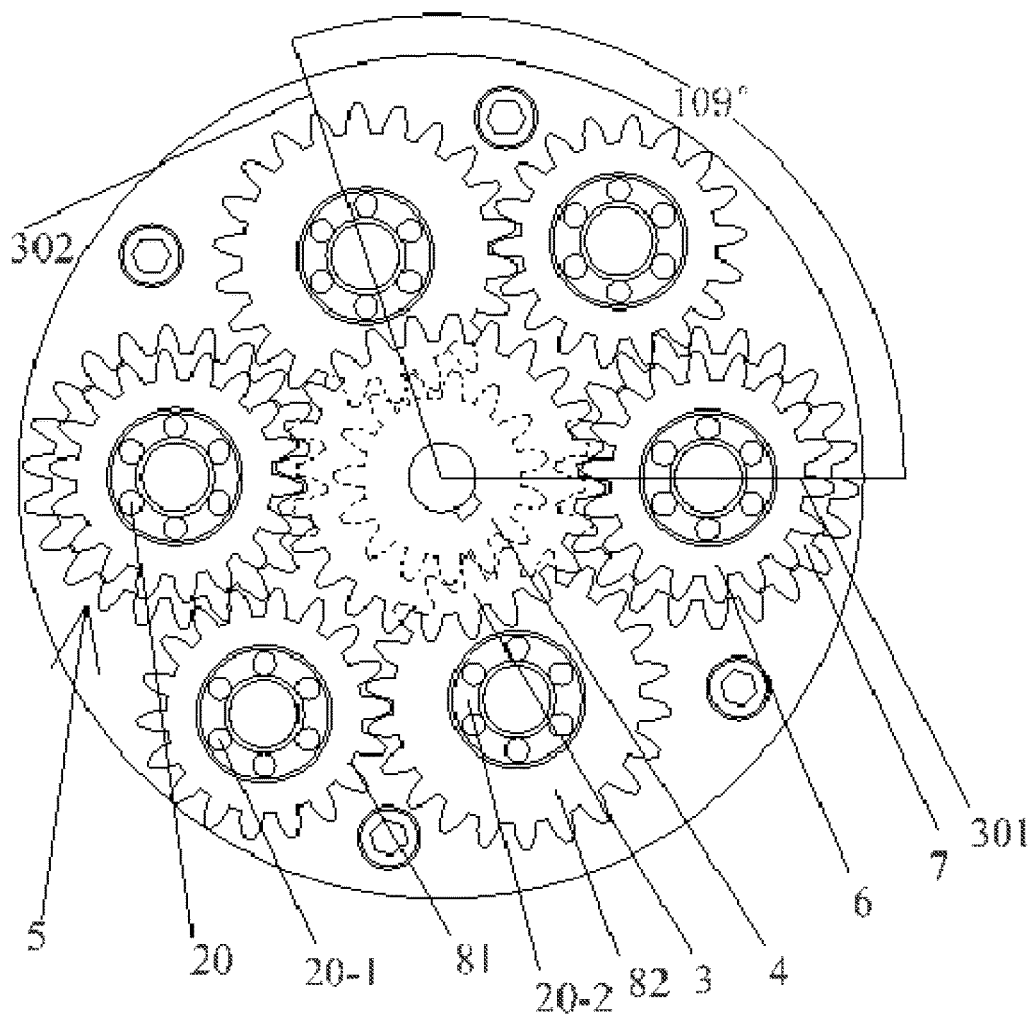
FIG. 18 is a top view of a gear-lever mechanism using meshing and pushing for rotation in an embodiment of the present invention where two idler gears in a driven gear set are configured on a lower layer.

Referring further to FIGS. 17 and 18, in another preferred solution of the present invention, compared with FIG. 1 and FIG. 2, in this solution, the first idler gear 81 and the second idler gear 82 are both meshed between the lower transfer-layer gear part 7 and the fixed bearing gear 4. Specifically, the driving gear 3 is directly connected with the upper transfer-layer gear part 6, the upper transfer-layer gear part 6 coaxially and synchronously drives the lower transfer-layer gear part 7, the lower transfer-layer gear part 7 is connected with the first idler gear 81, the first idler gear 81 drives the second idler gear 82, and the second idler gear 82 is meshed with the fixed bearing gear 4 that is fixed to the shell 1.

The first idler gear 81 and the second idler gear 82 connect, in the manner of arc-shaped arrangement, the fixed bearing gear 4 and the lower transfer-layer gear part 7.

The meshing point between the driving gear 3 and the transfer-layer gear is a driving point, the meshing point between the fixed bearing gear 4 and the second idler gear 82 is a bearing point, the connecting line from the axial center of the driving gear 3 to the driving point is a first straight line 301, the connecting line from the axial center of the fixed bearing gear 4 to the bearing point is a second straight line 302, and the angle formed between the first straight line 301 and the second straight line 302 is a thrust angle, and the thrust angle is of 30-220°, preferably 109° in this solution.

In the present example, a first bearing 20 is arranged in the transfer-layer gear 5, a second bearing 20-1 is arranged in the first idler gear 81, and a third bearing 20-2 is arranged in the second idler gear 82. The inner sides of the first bearing 20, the second bearing 20-1 and the third bearing 20-2 are connected, in a sleeved manner, and fixed with the respective supporting shafts, and similarly, the other transmission gears in the driven gear set are all provided with bearings for connection with the supporting shafts in a sleeved manner. The rotatable part may be selected from a cylindrical roller bearing, a tapered roller bearing, a ball bearing, a deep groove ball bearing and a needle roller bearing, or may be replaced by a sliding sleeve obtained through powder metallurgy.

Compared with the arrangement of arranging the bearing between the gear and the shaft, the bearing can also be arranged between the supporting frame and the supporting shaft, so that the supporting shaft can rotate relative to the supporting frame. In this solution, the tooth number of the driving gear is 24, the tooth number of the fixed bearing gear 4 is 14, the tooth number of the upper transfer-layer gear part 6 is 18, and the tooth number of the lower transfer-layer gear part 7 is 26. In this case, the driving gear 3 rotates by one turn, and the supporting frame 2 drives the driven gear set to rotate by 1.7 turns, thereby achieving speed raising In one variant of this solution, the tooth number of the driving gear 3 is 18, the tooth number of the fixed bearing gear 4 is 18, the tooth number of the upper transfer-layer gear part 6 is 18, and the tooth number of the lower transfer-layer gear part 7 is 36. In this case, the driving gear rotates clockwise by one turn, and the supporting frame 2 drives the driven gear set to rotate anticlockwise by 2 turns.

In the solution, among the output turns, meshing transmission accounts for 50% and pushing rolling accounts for 50%.

In another variant of this solution, the tooth number of the driving gear 3 is 28, the tooth number of the fixed bearing gear 4 is 29, the tooth number of the upper transfer-layer gear part 6 is 40, and the tooth number of the lower transfer-layer gear part 7 is 41. In this case, the driving gear rotates clockwise by one turn, and the supporting frame 2 drives the driven gear set to rotate anticlockwise by 95.67 turns, thereby achieving speed increasing. In the solution, among the output turns, meshing transmission accounts for 1.1% and pushing rolling accounts for 98.9%.

Figure 32:
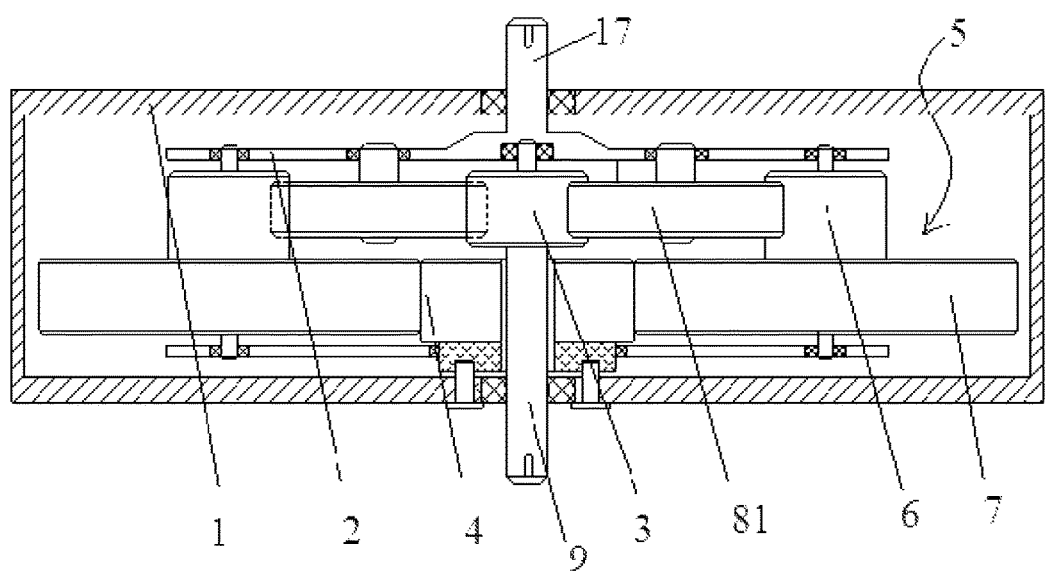
FIG. 32 is a section view of a gear-lever mechanism using meshing and pushing for rotation in an embodiment of the present invention where a single idler gear is provided.

Referring further to FIG. 32, compared with FIG. 1, in the solution, a single idler gear (i.e., the first idler gear 81) is arranged between the driving gear 3 and the upper transfer-layer gear part 6. Compared with the solution of double idler gears in FIG. 1, this solution discloses decelerated movement where the input rotational speed is higher than the output rotational speed.

The gear-lever mechanism of the present invention can be mounted or connected to a manual machine or a power machine for driving of vehicles, ships and airplanes, power generation or other circumstance where power output is required.

The tooth number of the idler gear of the gear-lever transmission mechanism has no influence on the output/input speed ratio of the gear-lever transmission mechanism.

Some of the set data of the gear ratio and the rotational speed ratio in the present invention that are not shown in the form of examples are shown in the table below:

| Driving gear | Fixed bearing gear | Upper transfer-layer gear part | Lower transfer-layer gear part | Output/input rotational speed ratio | |
|---|---|---|---|---|---|
| 20 | 20 | 20 | 20 | No rotation | 0 |
| 30 | 20 | 10 | 20 | clockwise | 1.5 |
| 28 | 20 | 12 | 20 | clockwise | 1.75 |
| 18 | 18 | 18 | 36 | clockwise | 2 |
| 18 | 18 | 18 | 32 | clockwise | 3 |
| 18 | 18 | 29 | 36 | clockwise | 5.143 |
| 18 | 18 | 32 | 36 | clockwise | 9 |
| 18 | 18 | 33 | 36 | clockwise | 12 |
| 18 | 18 | 34 | 36 | clockwise | 18 |
| 18 | 18 | 35 | 36 | clockwise | 36 |
| 40 | 39 | 36 | 36 | clockwise | 40 |
| 18 | 18 | 49 | 50 | clockwise | 50 |
| 29 | 28 | 41 | 40 | clockwise | 96.67 |
| 20 | 26 | 20 | 14 | anticlockwise | 1.1667 |
| 20 | 24 | 20 | 16 | anticlockwise | 2 |
| 20 | 22 | 20 | 18 | anticlockwise | 4.5 |
| 20 | 21 | 20 | 19 | anticlockwise | 9.5 |
| 19 | 20 | 21 | 20 | anticlockwise | 9.5 |
| 18 | 20 | 22 | 20 | anticlockwise | 4.5 |
| 16 | 20 | 24 | 20 | anticlockwise | 2 |
| 18 | 18 | 38 | 36 | anticlockwise | 18 |
| 18 | 18 | 36 | 35 | anticlockwise | 35 |
| 18 | 18 | 50 | 49 | anticlockwise | 49 |
| 28 | 29 | 40 | 41 | anticlockwise | 95.67 |

Example 2

Figure 7:
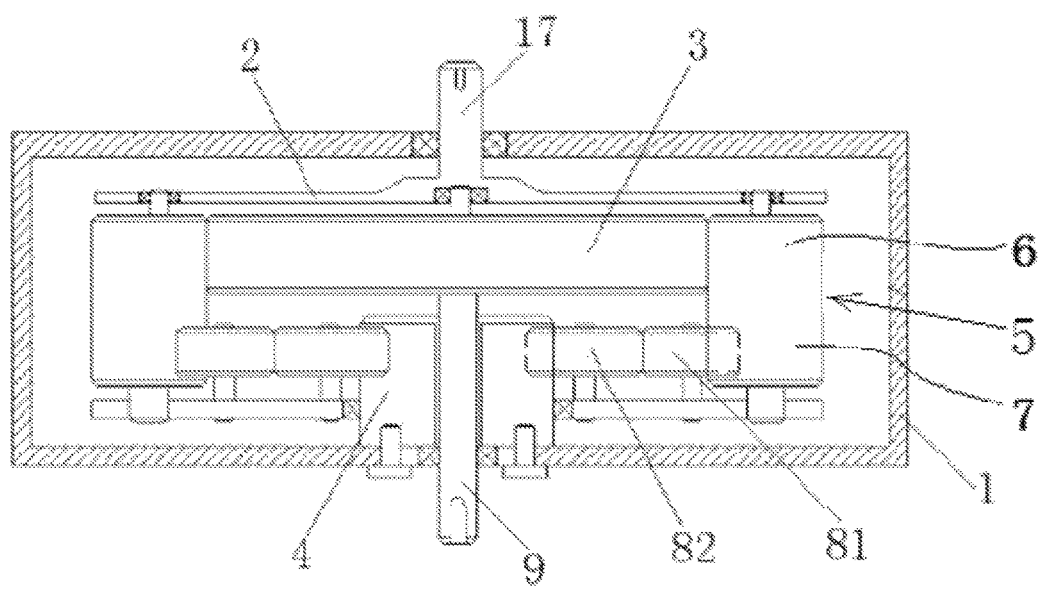
FIG. 7 is a side sectional view of a gear-lever mechanism using meshing and pushing for rotation in an embodiment of the present invention where two idler gears in a driven gear set are configured between a transfer-layer gear and a fixed bearing gear.
Figure 8:
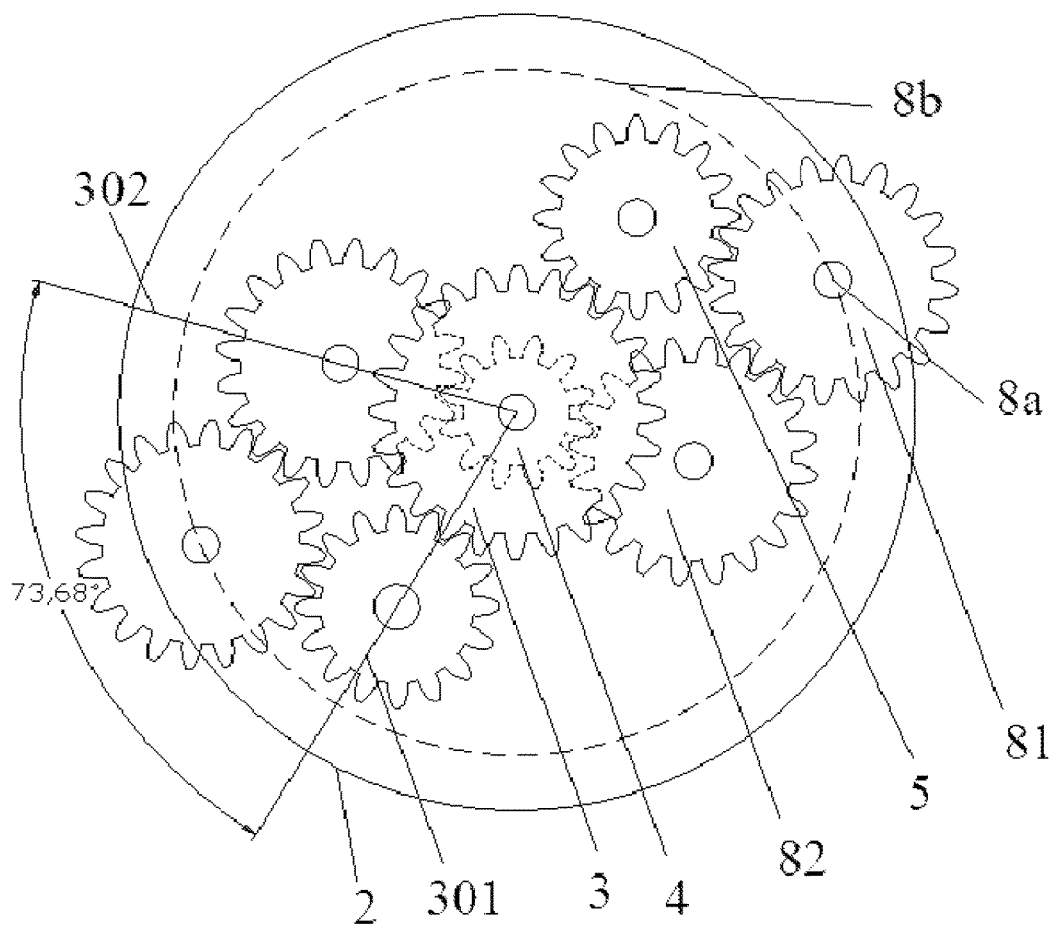
FIG. 8 is a top view of a gear-lever mechanism using meshing and pushing for rotation in an embodiment of the present invention where two idler gears in a driven gear set are configured between a transfer-layer gear and a fixed bearing gear.

As shown in FIG. 7 and FIG. 8, another gear-lever mechanism using meshing and pushing for rotation in the present invention comprises an input shaft 9 and an output shaft 17 which are connected with a driving gear 3, and further an output device. The output device is connected between the input shaft 9 and the output shaft 17.

In the above, the output device comprises an idler gear set, a transfer-layer gear 5, a supporting frame 2, a fixed bearing gear 4 and a shell 1, with the fixed bearing gear 4 being fixed on the shell 1. The idler gear set includes a first idler gear 81 and a second idler gear 82, the transfer-layer gear 5 comprises an upper transfer-layer gear part 6 and a lower transfer-layer gear part 7 which are coaxially arranged up and down, and the input shaft 9 passes through the shell 1 and is connected at the centers of the driving gear 3 and the fixed bearing gear 4.

The driving gear 3, the transfer-layer gear 5 comprising the coaxially arranged upper transfer-layer gear part 6 and lower transfer-layer gear part 7, and the idler gear set consisting of the first idler gear 81 and the second idler gear 82 are all mounted in the supporting frame 2, and the fixed bearing gear 4 shares the same axial center with the driving gear 3. The driving gear 3 is driven by the input shaft 9, the driving gear 3 and the upper transfer-layer gear part 6 are sequentially meshed and pushed to rotate on the upper-layer plane, the lower transfer-layer gear part 7, the first idler gear 81, the second idler gear 82 and the fixed bearing gear 4 are sequentially meshed and pushed to rotate on the lower-layer plane, the output shaft 17 and the supporting frame 2 are connected into one piece, the transfer-layer gear 5, the first idler gear 81 and the second idler gear 82 perform planetary meshing-pushing rotation around the driving gear 3 and the fixed bearing gear 4, forming a meshing-pushing lever type power output path for the output to the outside. The rotational force provided by the input shaft 9 is output to the outside by the output shaft 17, and the driven gear set performs planetary meshing-pushing rotation around the fixed bearing gear 4, so that the rotational speed of the output shaft 17 exceeds the rotational speed of the driving gear 3.

The diameter of the movement trail 8b of the axial center 8a of the outmost supporting shaft formed when rotating along with the supporting shaft is 1.2 times of the diameter of the driving gear 3.

As a preferred embodiment, the diameter of the upper transfer-layer gear part 6 is equal to that of the lower transfer-layer gear part 7.

As a more preferred embodiment, with the driving gear 3 as the center, at least two idler gear sets composed of the first idler gear 81 and the second idler gear 82 and the driven gear set of the transfer-layer gears 5 are arranged in array, the arrayed first idler gears 81 are simultaneously meshed and pushed to rotate by the driving gear 3, and the arrayed second idler gears 82 simultaneously perform planetary meshing-pushing rotation at a periphery of the fixed bearing gear 4, forming at least two meshing-pushing lever type power output paths for the output to the outside. For example, two, three or four idler gear sets including the first idler gear 81 and the second idler gear 82 and the driven gear set of the transfer-layer gears 5 are arrayed to form at least two meshing-pushing lever type power output paths for the output to the outside.

The meshing point between the driving gear 3 and the transfer-layer gear 5 is a driving point, the meshing point between the second idler gear 82 and the fixed bearing gear 4 is a bearing point, the connecting line from the axial center of the driving gear 3 to the driving point is a first straight line 301, the connecting line from the axial center of the fixed bearing gear 4 to the bearing point is a second straight line 302, and the angle formed between the first straight line 301 and the second straight line 302 is a thrust angle, and the thrust angle is of 30-220°, preferably 73.68° in this solution.

Figure 9:
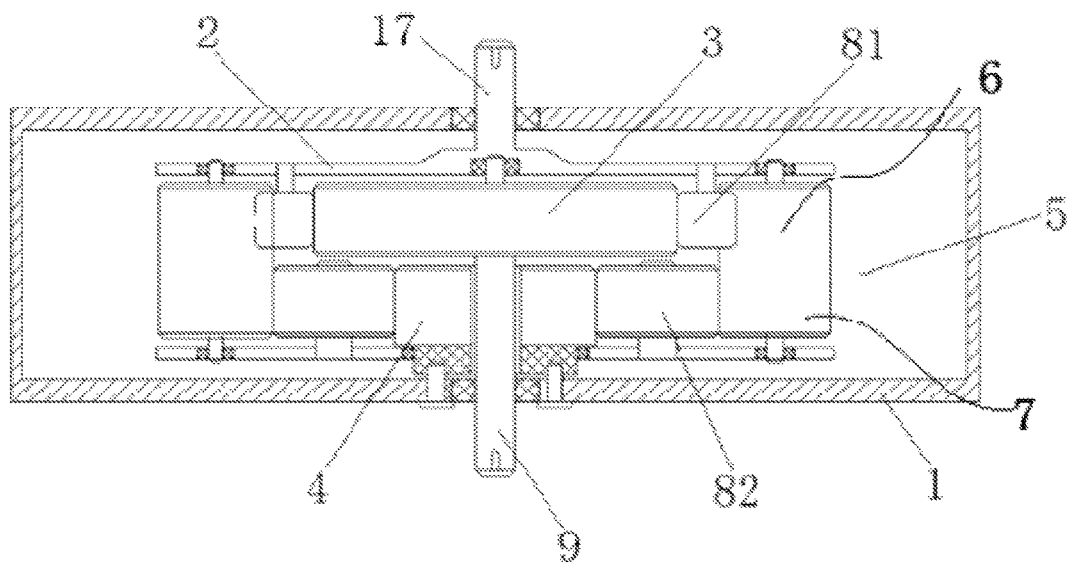
FIG. 9 is a sectional view of a gear-lever mechanism using meshing and pushing for rotation in an embodiment of the present invention where two idler gears in a driven gear set are not provided in a same layer.
Figure 10:
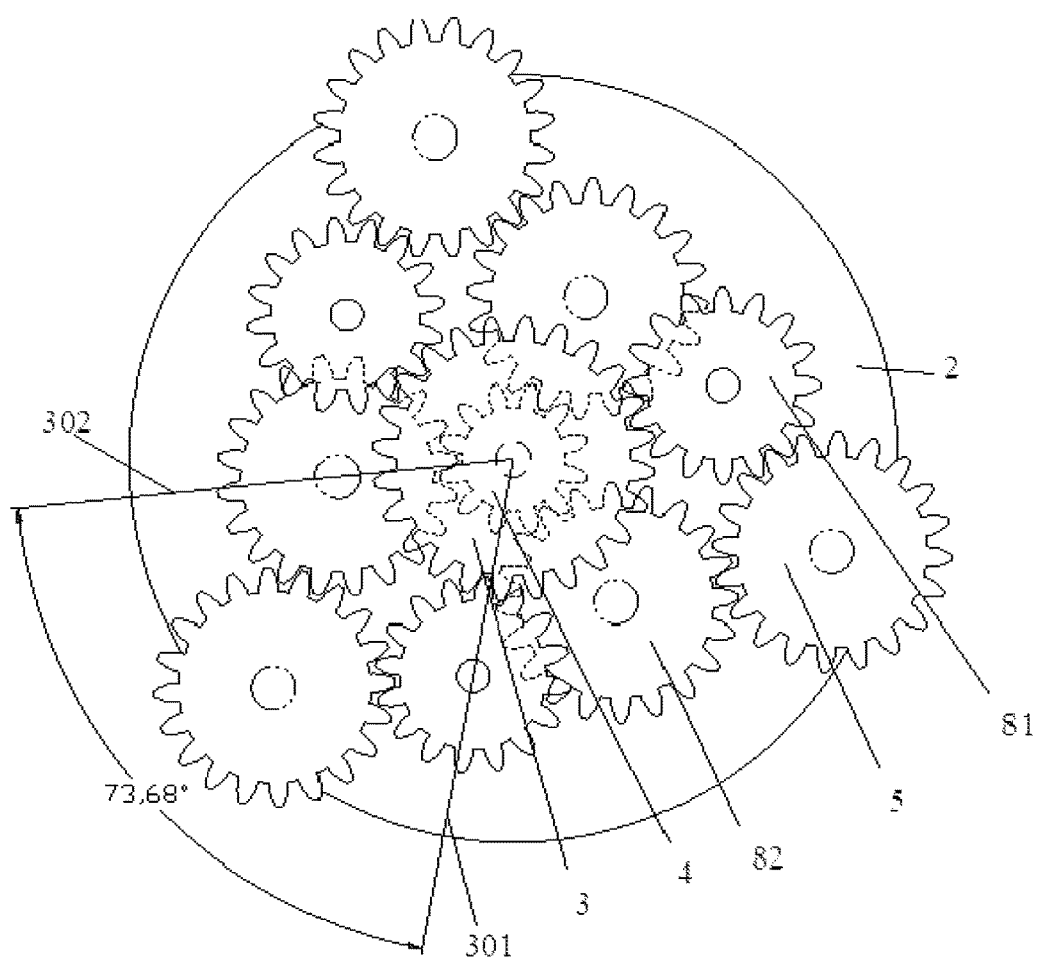
FIG. 10 is a top view of a gear-lever mechanism using meshing and pushing for rotation in an embodiment of the present invention where two idler gears in a driven gear set are not provided in a same layer.

As shown in FIG. 9 and FIG. 10, compared with the examples shown in FIG. 7 and FIG. 8, the differences lie in that the upper layer and the lower layer of the gear-lever mechanism are each provided with one idler gear, the driving gear 3 drives the upper transfer-layer gear part 6 of the transfer-layer gear 5 via the first idler gear 81, and the lower transfer-layer gear part 7 of the transfer-layer gear 5 and the second idler gear 82 are connected to the fixed bearing gear 4.

Particularly, in the present example, the upper transfer-layer gear part 6 and the lower transfer-layer gear part 7 of the transfer-layer gear 5 are the same in the tooth number and can be synchronously driven, and the total tooth number of the upper transfer-layer gear part 6 and the driving gear 3 is not equal to the total tooth number of the lower transfer-layer gear part 7 and the fixed bearing gear 4.

The first idler gear 81, the second idler gear 82 and the transfer-layer gear are arranged in a triangular shape, there are three annular arrays surrounding the axial center of the driving gear 3, the transfer-layer gear is connected to the fixed bearing gear 4 and the driving gear 3 via the first idler gear 81 and the second idler gear 82, respectively.

The meshing point between the driving gear 3 and the first idler gear 81 is a driving point, the meshing point between the second idler gear 82 and the fixed bearing gear 4 is a bearing point, the connecting line from the axial center of the driving gear 3 to the driving point is a first straight line 301, the connecting line from the axial center of the fixed bearing gear 4 to the bearing point is a second straight line 302, and the angle formed between the first straight line 301 and the second straight line 302 is a thrust angle, and the thrust angle is of 30-220°, preferably 73.68° in this solution.

Figure 11:
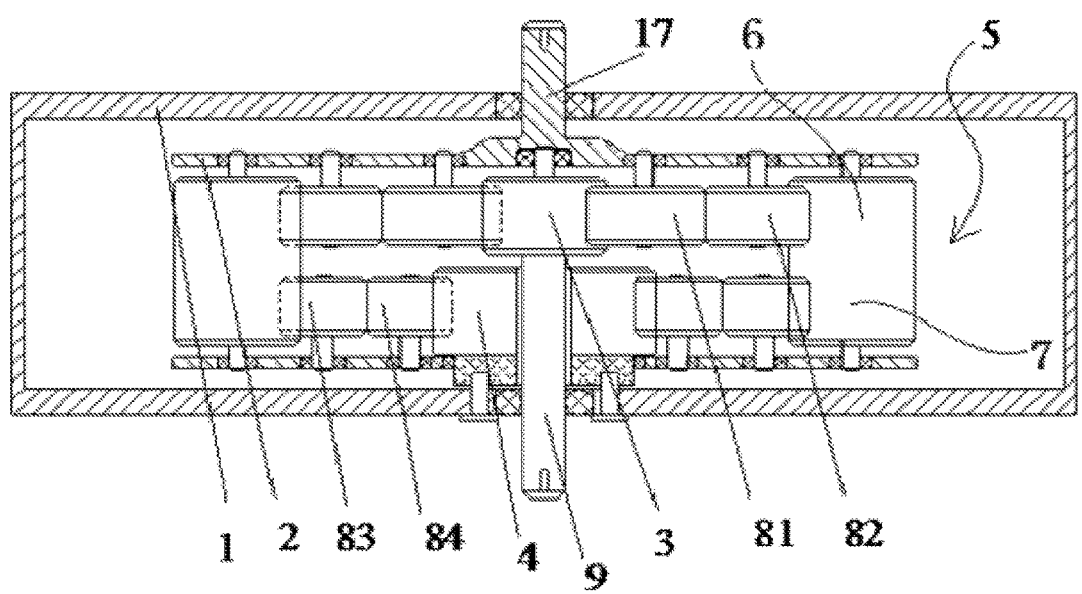
FIG. 11 is a sectional view of a gear-lever mechanism using meshing and pushing for rotation in an embodiment of the present invention where four idler gears in a driven gear set are provided in both upper and lower layers.
Figure 12:
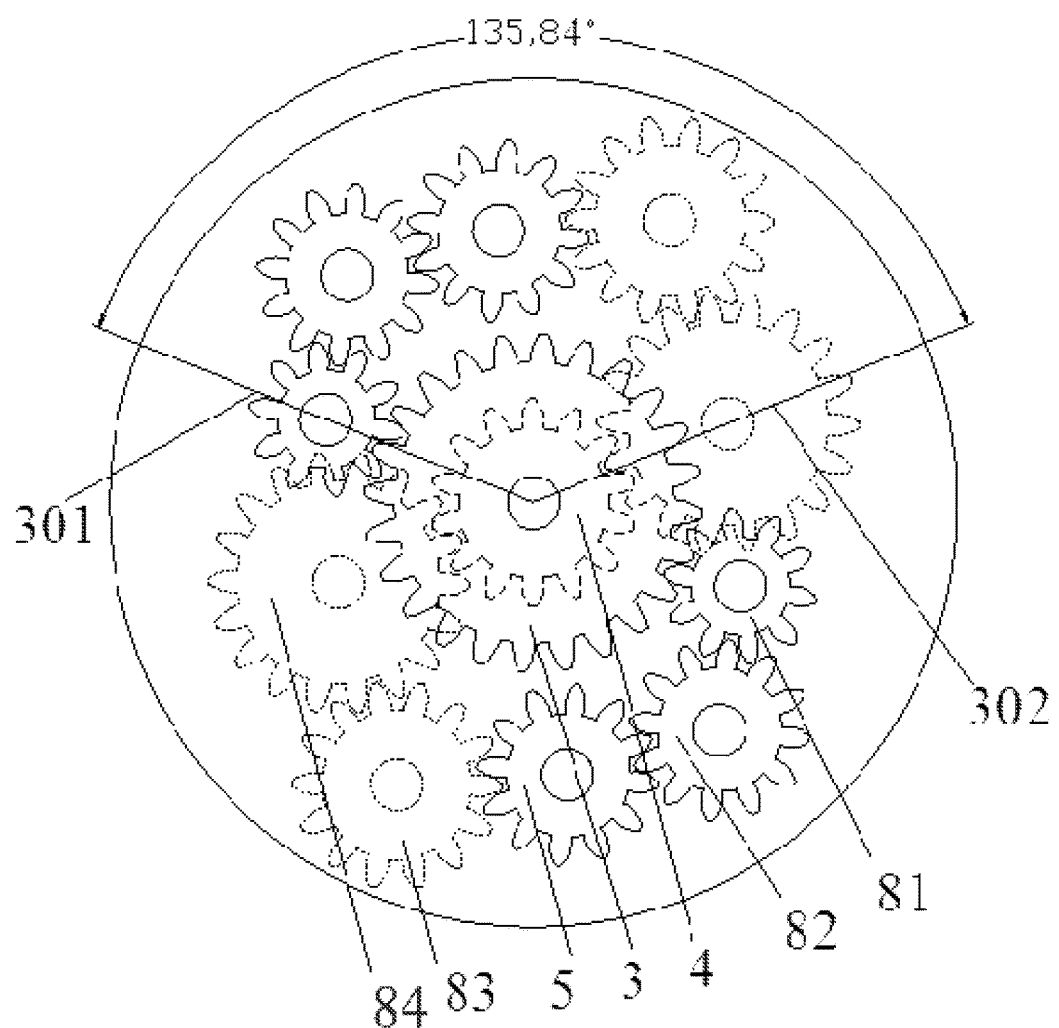
FIG. 12 is a top view of a gear-lever mechanism using meshing and pushing for rotation in an embodiment of the present invention where four idler gears in a driven gear set are provided in both upper and lower layers.

Referring to FIG. 11 and FIG. 12, compared with the examples shown in FIG. 7 and FIG. 8, the differences lie in that the upper layer and the lower layer of the gear-lever mechanism are each provided with two idler gears, the driving gear 3 drives the second idler gear 82 via the first idler gear 81, the second idler gear 82 drives the upper transfer-layer gear part 6 of the transfer-layer gear 5, the lower transfer-layer gear part 7 of the transfer-layer gear 5 is connected with the third idler gear 83, and the third idler gear 83 is connected to the fixed bearing gear 4 via the fourth idler gear 84.

Particularly, in the present example, the upper transfer-layer gear part 6 and the lower transfer-layer gear part 7 of the transfer-layer gear 5 are the same in the tooth number and can be synchronously driven, and the total tooth number of the upper transfer-layer gear part 6 and the driving gear 3 is not equal to the total tooth number of the lower transfer-layer gear part 7 and the fixed bearing gear 4.

The meshing point between the driving gear 3 and the first idler gear 81 is a driving point, the meshing point between the fourth idler gear 84 and the fixed bearing gear 4 is a bearing point, the connecting line from the axial center of the driving gear 3 to the driving point is a first straight line 301, the connecting line from the axial center of the fixed bearing gear 4 to the bearing point is a second straight line 302, and the angle formed between the first straight line 301 and the second straight line 302 is a thrust angle, and the thrust angle is of 30-220°, preferably 135.84° in this solution.

The gear-lever mechanism of the present invention can be mounted or connected to a manual machine or a power machine for driving of vehicles, ships and airplanes, power generation or other circumstances where power output is required.

Example 3

Figure 15:
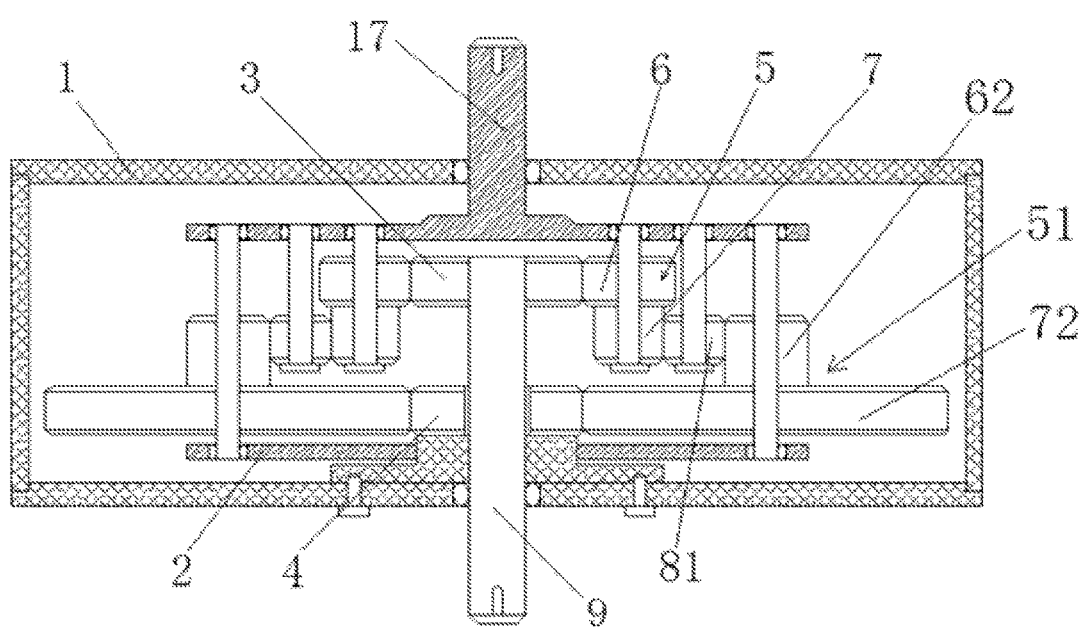
FIG. 15 is a side sectional view of a gear-lever mechanism using meshing and pushing for rotation in an embodiment of the present invention where a driven gear set is provided with two transfer-layer gears.
Figure 16:
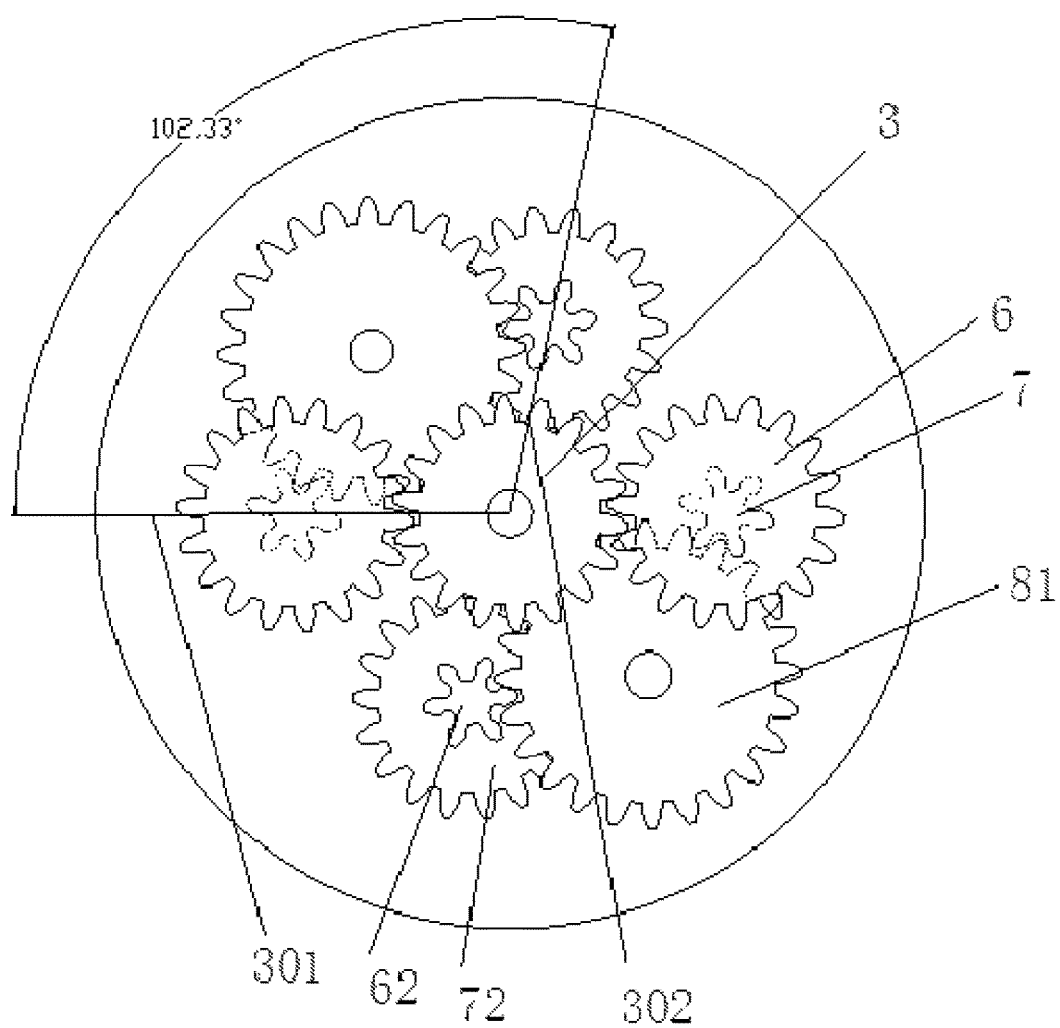
FIG. 16 is a top view of a gear-lever mechanism using meshing and pushing for rotation in an embodiment of the present invention where a driven gear set is provided with two transfer-layer gears.

As shown in FIG. 15 and FIG. 16, a gear-lever mechanism using meshing and pushing for rotation in the present invention comprises an input shaft 9 and an output shaft 17 which are connected with a driving gear 3, and further an output device. The output device is connected between the driving gear 3 and the output shaft 17, and the rotation direction of the output device is the same as that of the driving gear 3.

In the above, the output device comprises two driven gear sets each comprising a transfer-layer gear 5, a first idler gear 81, a second transfer-layer gear 51, a supporting frame 2, a fixed bearing gear 4 and a shell 1. The transfer-layer gear 5 comprises an upper transfer-layer gear part 6 and a lower transfer-layer gear part 7 which are coaxially connected up and down, the second transfer-layer gear 51 comprises a second upper transfer-layer gear part 62 and a second lower transfer-layer gear part 72 which are coaxially connected, the fixed bearing gear 4 is fixed on the shell 1, the input shaft 9 passes through the shell 1 and the fixed bearing gear 4, and is connected to the center of the driving gear 3, the driving gear 3 synchronously rotates along with the input shaft 9, and the fixed bearing gear 4 is movably connected with the input shaft 9 via a bearing. The transfer-layer gear 5, the first idler gear 81 and the second transfer-layer gear 51 are all mounted in the supporting frame 2.

The driving gear 3 is driven by the input shaft 9, the driving gear 3 and the upper transfer-layer gear part 6 are sequentially meshed and pushed to rotate on the upper-layer plane, the lower transfer-layer gear part 7, the first idler gear 81 and the second transfer-layer gear part 62 are sequentially meshed and driven on the middle-layer plane, the second lower transfer-layer gear part 72 and the fixed bearing gear 4 are meshed on the lower-layer plane, and the output shaft 17 and the supporting frame 2 are connected into one piece. The rotational force provided by the input shaft 9 is output by the output shaft 17, and the rotation speed of the output shaft 17 exceeds the rotation speed of the driving gear 3.

As a preferred embodiment, the diameter of the upper transfer-layer gear part 6 of the transfer-layer gear 5 that is meshed with the driving gear 3 and pushed to rotate is larger than that of the lower transfer-layer gear part 7, and the diameter of the second upper transfer-layer gear part 62 of the transfer-layer gear 5 that performs planetary meshing-pushing rotation along the fixed bearing gear 4 is smaller than that of the second lower transfer-layer gear part 72.

As a more preferred embodiment, with the driving gear 3 as the center, at least two output devices comprising the transfer-layer gear 5, the first idler gear 81 and the second transfer-layer gear 51 are arrayed, forming at least two meshing-pushing lever type power output paths for the output to the outside.

The meshing point between the driving gear 3 and the upper transfer-layer gear part 6 is a driving point, the meshing point between the fixed bearing gear 4 and the second lower transfer-layer gear part 72 is a bearing point, the connecting line from the axial center of the driving gear 3 to the driving point is a first straight line 301, the connecting line from the axial center of the fixed bearing gear 4 to the bearing point is a second straight line 302, and the angle formed between the first straight line 301 and the second straight line 302 is a thrust angle, and the thrust angle is of 30-220°, preferably 102.33° in this solution.

Figure 31:
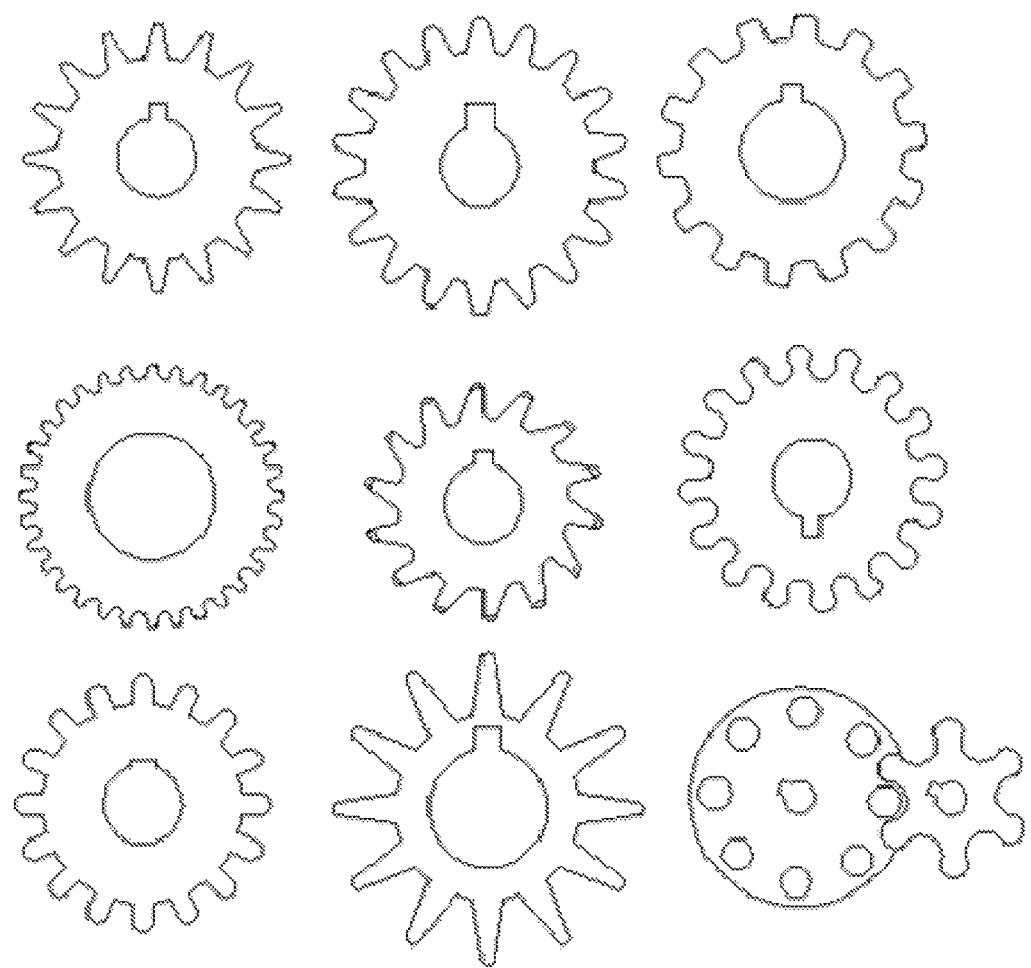
FIG. 31 is a top view of various gears involved in a gear-lever mechanism using meshing and pushing for rotation in an embodiment of the present invention.

As shown in FIG. 31, the gears (e.g., the idler gears, the driving gear, the transfer-layer gears and the fixed bearing gear) used in the gear-lever transmission mechanism are selected from a herringbone gear, a bevel gear, a modified gear, an involute gear, a triangular gear, a helical gear and a spiral gear, are not limited thereto, and can be replaced with each other.

The gear-lever mechanism of the present invention can be mounted or connected to a manual machine or a power machine for driving of vehicles, ships and airplanes, power generation or other circumstances where power output is required.

Example 4

Figure 19:
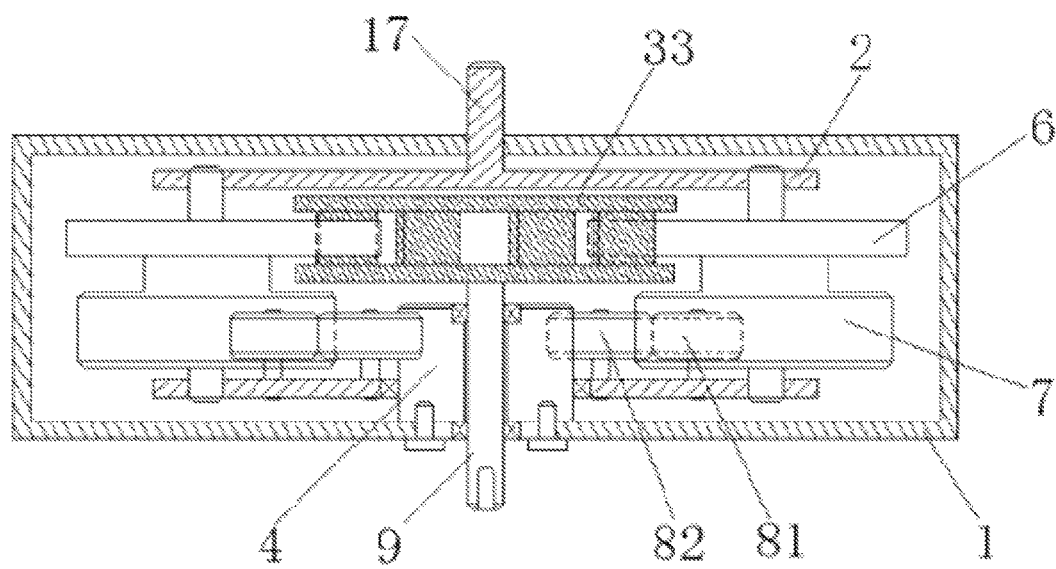
FIG. 19 is a sectional view of a gear-lever mechanism using meshing and pushing for rotation in an embodiment of the present invention where a drive gear is configured as a roller gear.
Figure 20:
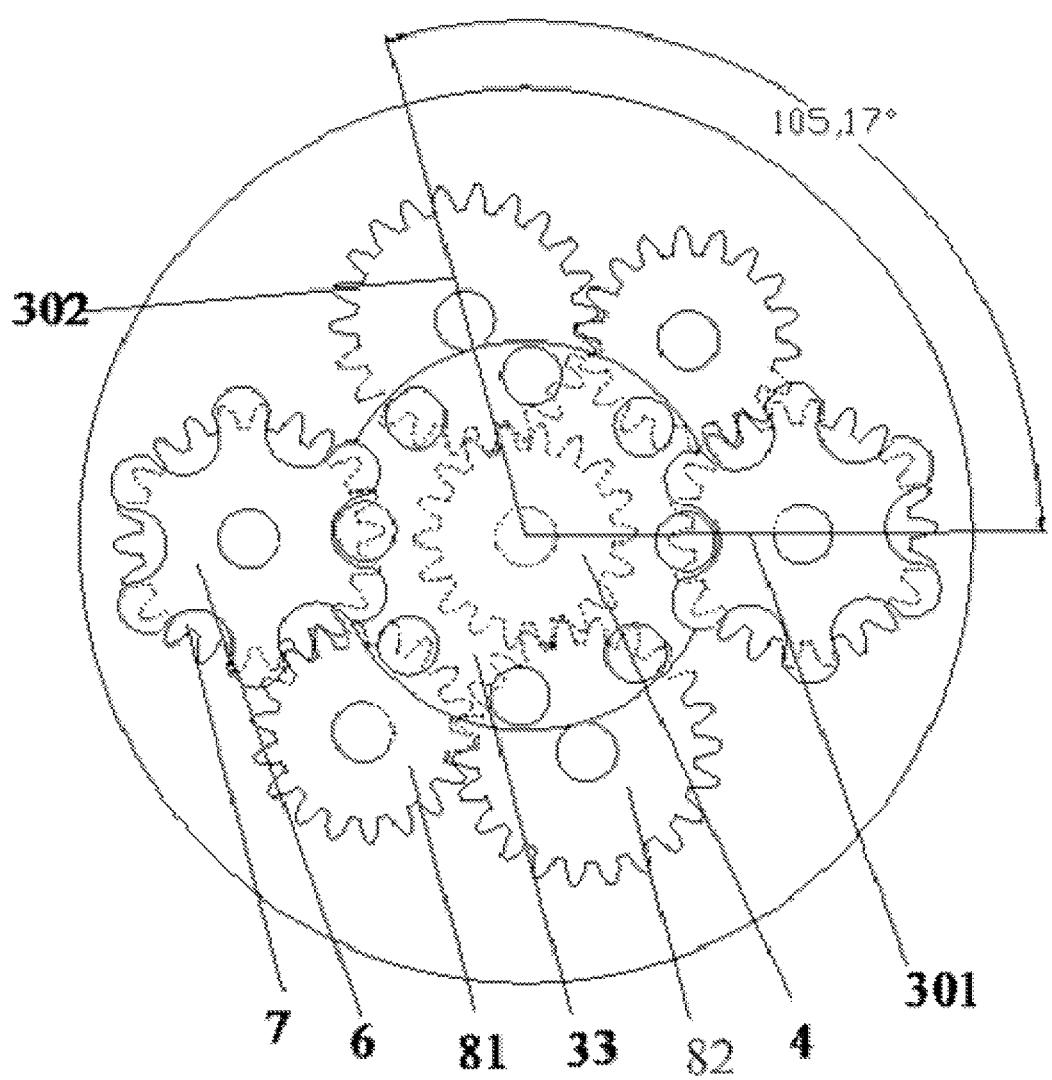
FIG. 20 is a top view of a gear-lever mechanism using meshing and pushing for rotation in an embodiment of the present invention where a drive gear is configured as a roller gear.

As shown in FIG. 19 and FIG. 20, a gear-lever mechanism using meshing and pushing for rotation comprises: a shell 1, a supporting frame 2, a driving gear, a fixed bearing gear 4, a transfer-layer gear and an idler gear. The transfer-layer gear and the idler gear form a driven gear set; the transfer-layer gear comprises an upper transfer-layer gear part 6 and a lower transfer-layer gear part 7 which are coaxially and fixedly connected, the driving gear is a roller gear 33, with the roller gear 33 comprising a circular rotary plate and 8 rollers evenly arranged at the outer circumference of the circular rotary plate and capable of rotating about their respective rotation shafts; the supporting frame 2 is arranged in the shell 1, the supporting frame 2 and the shell 1 are rotatable relative to each other, the supporting frame 2 is coaxially arranged with the fixed bearing gear 4, the supporting frame 2 is connected to the fixed bearing gear 4 in a sleeved mode and the supporting frame 2 can rotate about the axis of the fixed bearing gear 4, one end of the fixed bearing gear 4 is fixedly connected to the shell 1, the roller gear 33 is connected with an input shaft 9, on the outer side of the fixed bearing gear 4 is provided a first idler gear 81 and a second idler gear 82, the roller gear 33 directly drives the upper transfer-layer gear part 6 of the transfer-layer gear, the upper transfer-layer gear part 6 and the lower transfer-layer gear part 7 move synchronously, the lower transfer-layer gear part 7 of the transfer-layer gear is meshed with the first idler gear 81, the first idler gear 81 is meshed with the second idler gear 82, and the second idler gear 82 is connected to the fixed bearing gear 4.

The output shaft 17 is coaxially connected with the supporting frame 2, and after passing through the gear-lever transmission mechanism, the input torque is output through the output shaft 17 that is connected with the supporting frame 2. It should be noted that the tooth number of the upper transfer-layer gear part 6 of the transfer-layer gear is not equal to the tooth number of the lower transfer-layer gear part 7, the total tooth number of the upper transfer-layer gear part 6 and the roller gear 33 is not equal to the total tooth number of the lower transfer-layer gear part 7 and the fixed bearing gear 4, and when the roller gear 33 drives the transfer-layer gear and the idler gear to rotate, the second idler gear 82 performs meshing-pushing rotation along the outer circumference of the fixed bearing gear 4, so that the output of the supporting frame 2 is accelerated.

The hard friction produced by meshing between the gears is changed into rolling friction by using the roller gear 33. When the roller gear 33 pushes the upper transfer-layer gear part 6 to rotate, the rolling portion of the roller gear 33 rotates in the opposite direction at the same time to form rolling friction, thereby achieving pushing.

The meshing point between the roller gear 33 and the upper transfer-layer gear part 6 is a driving point, the meshing point between the fixed bearing gear 3 and the second idler gear 82 is a bearing point, the connecting line from the axial center of the roller gear 33 to the driving point is a first straight line 301, the connecting line from the axial center of the fixed bearing gear 4 to the bearing point is a second straight line 302, and the angle formed between the first straight line 301 and the second straight line 302 is a thrust angle, and the thrust angle is of 30-220°, preferably 105.17° in this solution.

As shown in FIG. 31, the gears (e.g., the idler gears, the driving gear, the transfer-layer gears and the fixed bearing gear) used in the gear-lever transmission mechanism are selected from a herringbone gear, a bevel gear, a modified gear, an involute gear, a triangular gear, a helical gear and a spiral gear, are not limited thereto and can be replaced with each other.

The gear-lever mechanism of the present invention can be mounted or connected to a manual machine or a power machine for driving of vehicles, ships and airplanes, power generation or other circumstances where power output is required.

Example 5

Figure 21:
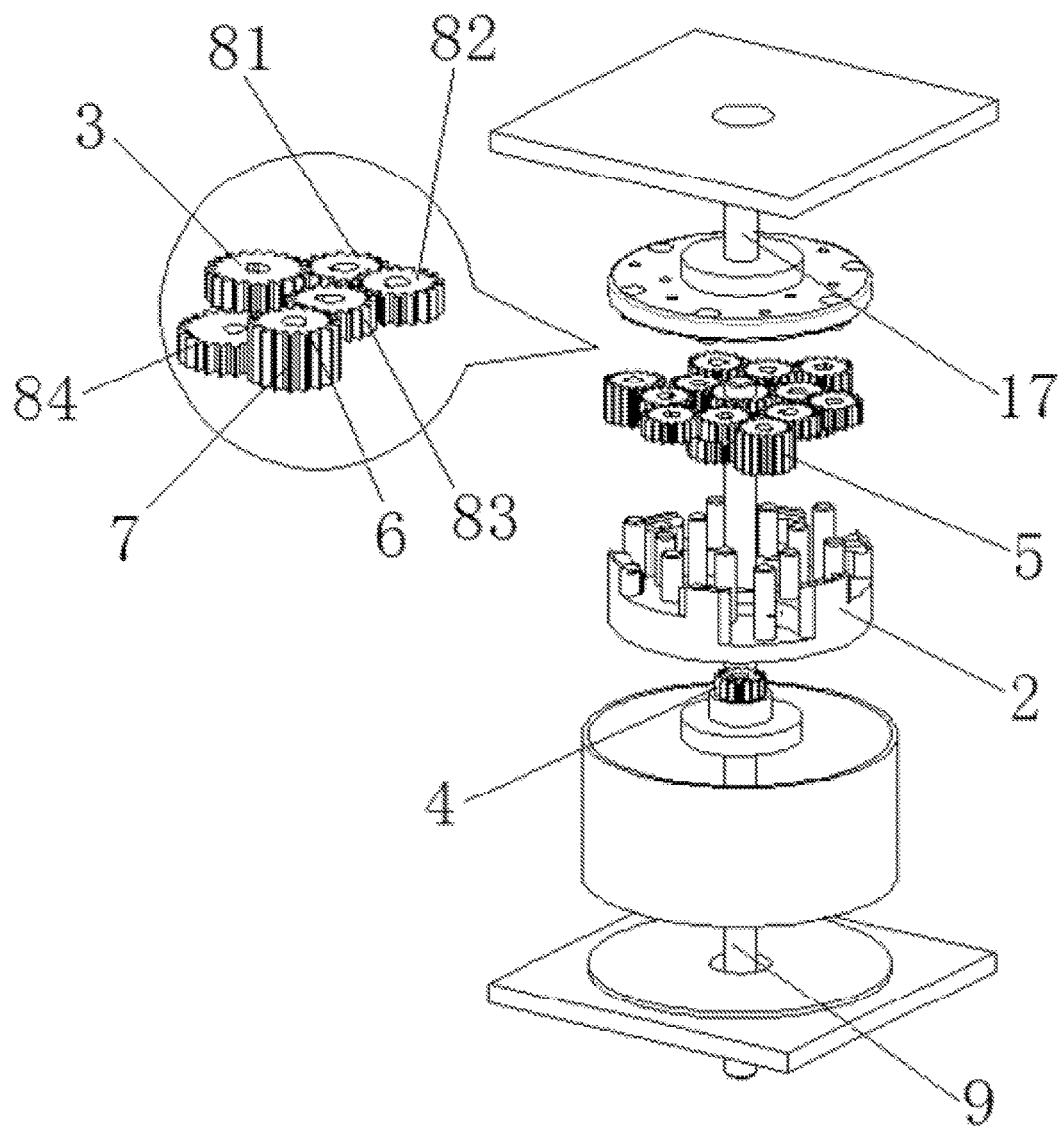
FIG. 21 is an exploded view of a gear-lever mechanism using meshing and pushing for rotation in an embodiment of the present invention where a driven gear set is provided with four idler gears distributed up and down in unequal numbers.
Figure 22:
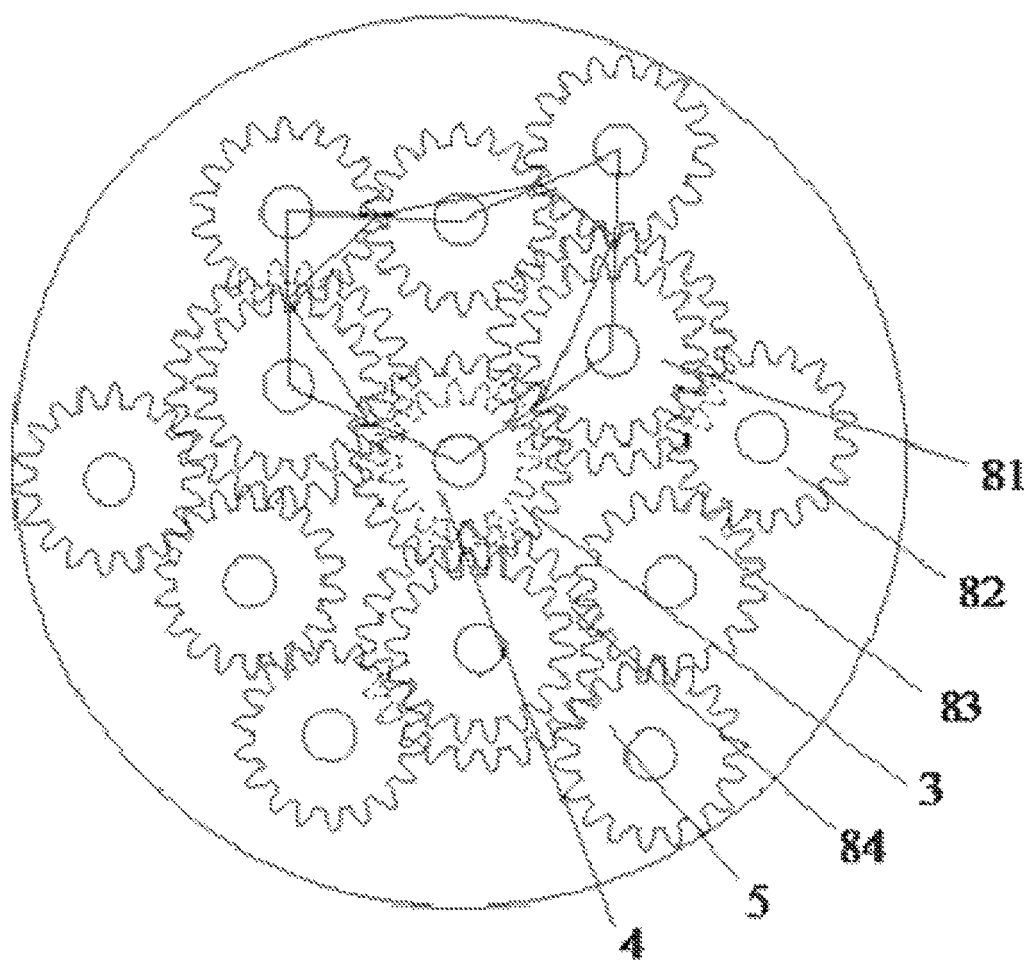
FIG. 22 is a top view of a gear-lever mechanism using meshing and pushing for rotation in an embodiment of the present invention where a driven gear set is provided with four idler gears distributed up and down in unequal numbers.
Figure 23:
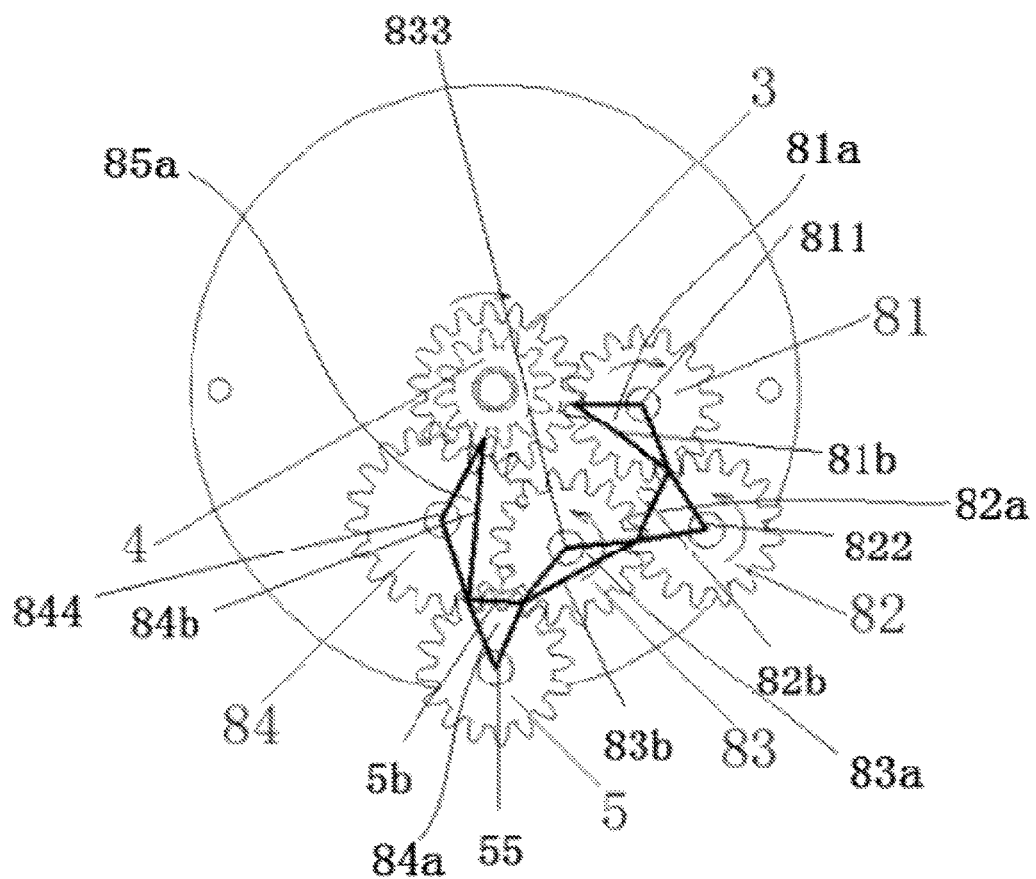
FIG. 23 is a top view showing a single driven gear set structure of a gear-lever mechanism using meshing and pushing for rotation in an embodiment of the present invention where a driven gear set is provided with four idler gears distributed up and down in unequal numbers.

As shown in FIG. 21, FIG. 22 and FIG. 23, a gear-lever mechanism using meshing and pushing for rotation comprises: a shell 1, an input shaft 9 and an output shaft 17, and further comprises an input device comprising a driving gear 3, with the driving gear 3 configured to rotate synchronously with the input shaft 9; a positioning device at least comprising one fixed bearing gear 4, with the fixed bearing gear 4 arranged coaxially with the input shaft 9 and unrotatably arranged in the shell 1; an output device comprising three driven gear sets and a supporting frame 2 supporting the driven gear sets and enabling the three driven gear sets to rotate freely in the shell 1. Each driven gear set comprises two idler gears and one transfer-layer gear 5, and the transfer-layer gear 5 and the idler gears form a two-layered gear transmission structure.

Specifically, the supporting frame 2 is rotationally connected with the shell 1 via a bearing, the supporting frame 2 is coaxially connected to the fixed bearing gear 4 in a sleeved mode, and can rotate about the fixed bearing gear 4, the lower end of the fixed bearing gear 4 is fixed to the shell 1, the input shaft 9 passes through the center of the fixed bearing gear 4 from the bottom up and is fixedly connected with the driving gear 3, and the input shaft 9 and the fixed bearing gear 4 rotate relative to each other.

In the present embodiment, the idler gears each include a first idler gear 81, a second idler gear 82, a third idler gear 83 and a fourth idler gear 84. The first idler gear 81, the second idler gear 82 and the third idler gear 83 are arranged, in a triangular shape, between the driving gear 3 and the upper transfer-layer gear part 6 for performing meshing-pushing rotation, the first idler gear 81, the second idler gear 82 and the third idler gear 83 are meshed in sequence, and the fourth idler gear 84 is arranged between the lower transfer-layer gear part 7 and the fixed bearing gear 4 for performing meshing-pushing rotation.

The axial center of the first idler gear 81 is a first sub-bearing point 811, the first idler gear 81 forms two meshing points with the driving gear 3 and the second idler gear 82, the first sub-bearing point 811 and the two meshing points form a first triangular pushing area 81a. The line connecting the two meshing points form a first output path 81b, the axial center of the second idler gear 82 is a second sub-bearing point 822, and the second idler gear 82 forms two meshing points with the first idler gear 81 and the third idler gear 83. The second sub-bearing point 822 and the two meshing points form a second triangular pushing area 82a, and the line connecting the two meshing points form a second output path 82b; the axial center of the third idler gear 83 is a third sub-bearing point 833, and the third idler gear 83 forms two meshing points with the second idler gear 82 and the transfer-layer gear 5. The third sub-bearing point 833 and the two meshing points form a third triangular pushing area 83a, the two meshing points form a third output path 83b; the axial center of the transfer-layer gear 5 is a fourth sub-bearing point 55, the transfer-layer gear 5 forms two meshing points with the fourth idler gear 84 and the third idler gear 83. The fourth sub-bearing point 55 and the two meshing points form a fourth triangular pushing area 84a, the line connecting the two meshing points form a fourth output path 5b; the axial center of the fourth idler gear 84 is a fifth sub-bearing point 844, the fourth idler gear 84 forms two meshing points with the transfer-layer gear 5 and the fixed bearing gear 4. The fifth sub-bearing point 844 and the two meshing points form a fifth triangular pushing area 85a, and the line connecting the two meshing points form a fifth output path 84b. The first output path 81b, the second output path 82b, the third output path 83b, the fourth output path 5b and the fifth output path 84b are continuously connected, and form a meshing-pushing lever type power output path from the driving gear 3 to the fixed bearing gear 4. The meshing-pushing lever type power output path shows a plurality of continuously arranged M-shapes.

The first idler gear 81, the second idler gear 82, the third idler gear 83, the transfer-layer gear 5 and the fourth idler gear 84 are sequentially and continuously meshed, and the axial centers of the gears form a plurality of M-shapes or a polyline in continuous arrangement.

The output shaft 17 is coaxially connected with the supporting frame 2, the input torque is output through the supporting frame 2 after passing through the driven gear set of the gear-lever transmission mechanism, and the fourth idler gear 84 performs meshing-pushing rotation along the fixed bearing gear 4.

As a more preferred embodiment, with the driving gear 3 as the center, three driven gear sets composed of four idler gears and one transfer-layer gear 5 are arranged in an annular array, forming three meshing-pushing lever type power output paths for the output to the outside.

As shown with reference to FIG. 31, the gears (e.g., the idler gear, the driving gear, the transfer-layer gear, the fixed bearing gear) used in the gear lever transmission mechanism are selected from herringbone gears, bevel gears, modified gears, involute gears, triangular gears, helical gears or spiral gears, but are not limited thereto and can be replaced and used equivalently.

The gear-lever mechanism of the present invention can be mounted or connected to a manual machine or a power machine for driving of vehicles, ships, and airplanes, power generation, or other circumstances where power output is required.

Example 6

Figure 24:
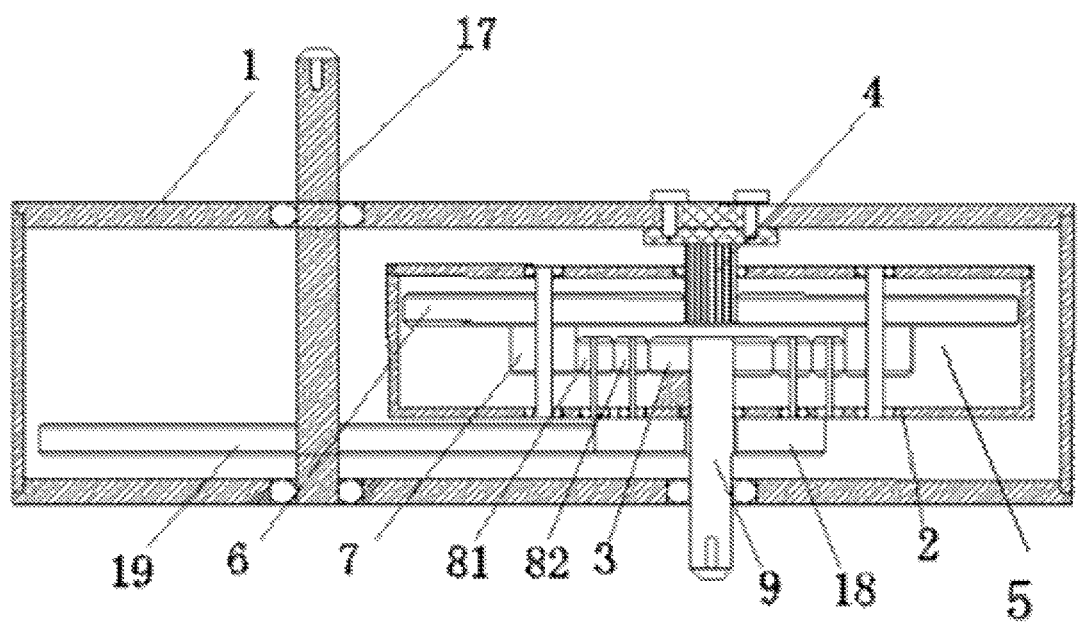
FIG. 24 is a sectional view of a gear-lever mechanism using meshing and pushing for rotation in an embodiment of the present invention where a reduction gear construction is equipped.
Figure 25:
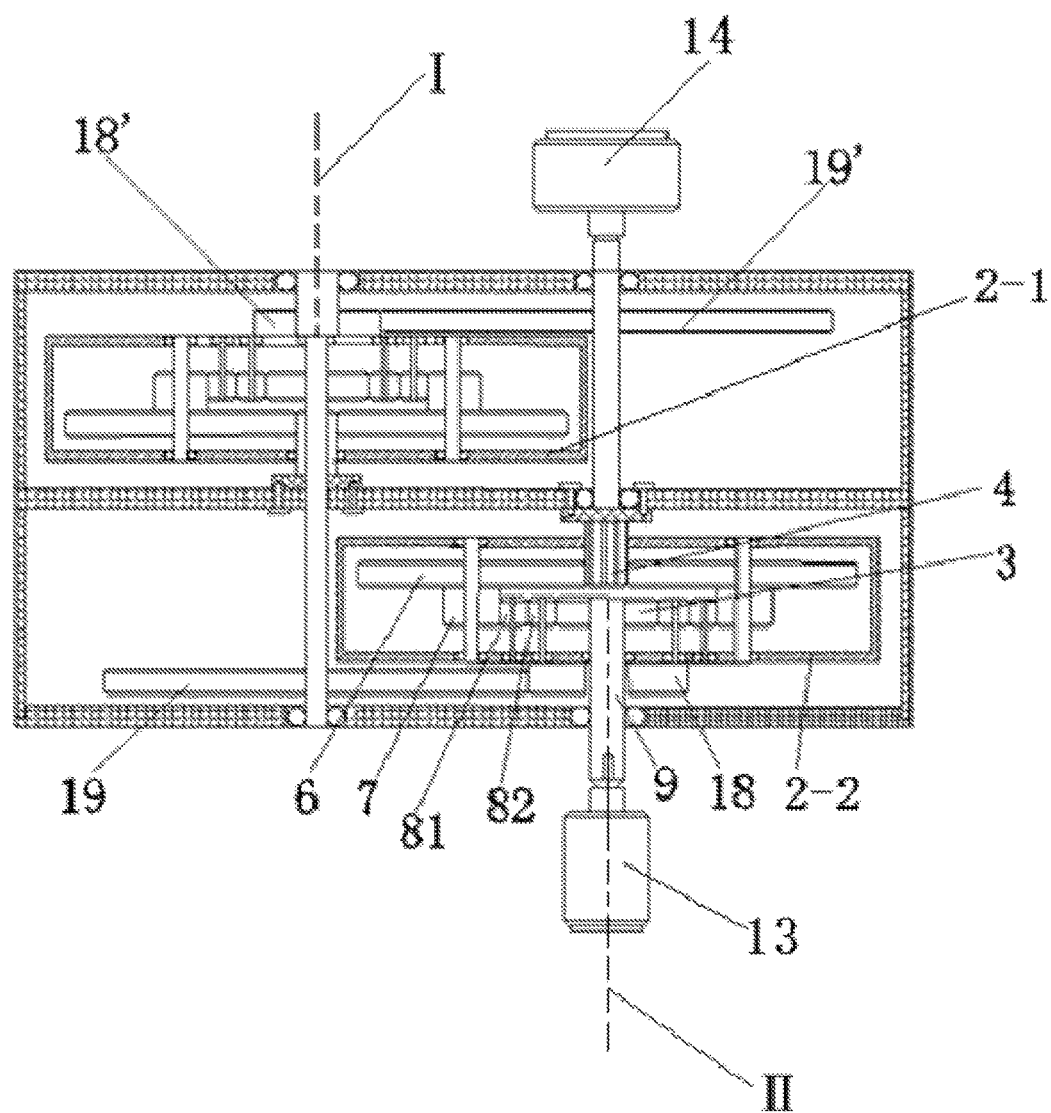
FIG. 25 is a sectional view showing an embodiment where gear-lever mechanisms using meshing and pushing for rotation in an embodiment of the present invention are stacked in two layers and the gear-lever mechanism is equipped with a reduction gear construction.

Refer to another variant example of the present invention shown in FIGS. 24 and 25. Referring to FIG. 24, the shell 1 is connected with a fixed bearing gear 4 disposed fixedly, the fixed bearing gear 4 is in sleeve joint with a rotatable supporting frame 2, the supporting frame 2 supports movable idler gears (i.e., a first idler gear 81 and a second idler gear 82) and a transfer-layer gear 5 constituted by an upper transfer-layer gear part 6 and a lower transfer-layer gear part 7, the fixed bearing gear 4 is coaxially provided with a driving gear 3 in a separate layer, the driving gear 3 is coaxially fixedly connected with an input shaft 9, the input shaft 9 passes through the shell 1 and is rotatable relative to the shell 1, the driving gear 3 is connected to the lower transfer-layer gear part 7 through the first idler gear 81 and the second idler gear 82, the lower transfer-layer gear part 7 and the upper transfer-layer gear part 6 are driven coaxially and synchronously, the upper transfer-layer gear part 6 is meshed with the fixed bearing gear 4, and the driving gear 3 rotates to push the first idler gear 81, the second idler gear 82 and the transfer-layer gear 5, and drives a driven gear set constituted by the first idler gear 81, the second idler gear 82 and the transfer-layer gear to perform meshing-pushing rotation around the fixed bearing gear 4, finally making the supporting frame 2 output.

A first reduction gear 18 is fixedly connected with the supporting frame 2 and is concentric with the driving gear 3. In order to further drive the first reduction gear 18, a second reduction gear 19, which is disposed in the same layer as the first reduction gear 18 and driven through meshing with the first reduction gear 18, is also disposed. An output shaft 17 is fixed at the center of the second reduction gear 19, the output shaft 17 is rotatably connected with the shell 1, and one end of the output shaft 17 protrudes from the shell 1 and outputs power inputted by the input shaft 9 to the outside.

Referring to FIG. 25, two gear-lever mechanisms are superimposed vertically and staggeredly in two layers for transmission, doubly improving the transmission effect. The structure of each of the two gear-lever mechanisms is substantially the same as that of the example of FIG. 24, but differs therefrom in that the idler gears of the gear-lever mechanism located at the top are arranged in the upper layer, the idler gears of the gear-lever mechanism located at the lower layer are arranged in the lower layer, and an axial center I of the first input shaft and an axial center II of the second input shaft are in staggered arrangement in different layers, the lower supporting frame 2-2 is coaxially connected with a first reduction gear 18, the first reduction gear 18 is connected with a second reduction gear 19, an axial center of the second reduction gear 19 is connected to the input shaft in the second layer, the upper supporting frame 2-1 is coaxially connected with a third reduction gear 18', the third reduction gear 18' is meshed and connected with a fourth reduction gear 19', and the output shaft of the fourth reduction gear 19' protrudes from the shell 1. The input shaft 9 of the device is connected with a motor 13, and the output shaft 17 of the device is connected with a power generator 14, so that the motor 13 drives the gear-lever mechanism to increase the speed and then achieve power generation using the power generator 14.

As shown with reference to FIG. 31, the gears (e.g., the idler gear, the driving gear, the transfer-layer gear, the fixed bearing gear) used in the gear-lever transmission mechanism are selected from herringbone gears, bevel gears, modified gears, involute gears, triangular gears, helical gears or spiral gears, but are not limited thereto and can be replaced and used equivalently.

The gear-lever mechanism of the present invention can be mounted or connected to a manual machine or a power machine for driving of vehicles, ships, and airplanes, power generation, or other circumstances where power output is required.

Example 7

Figure 26:
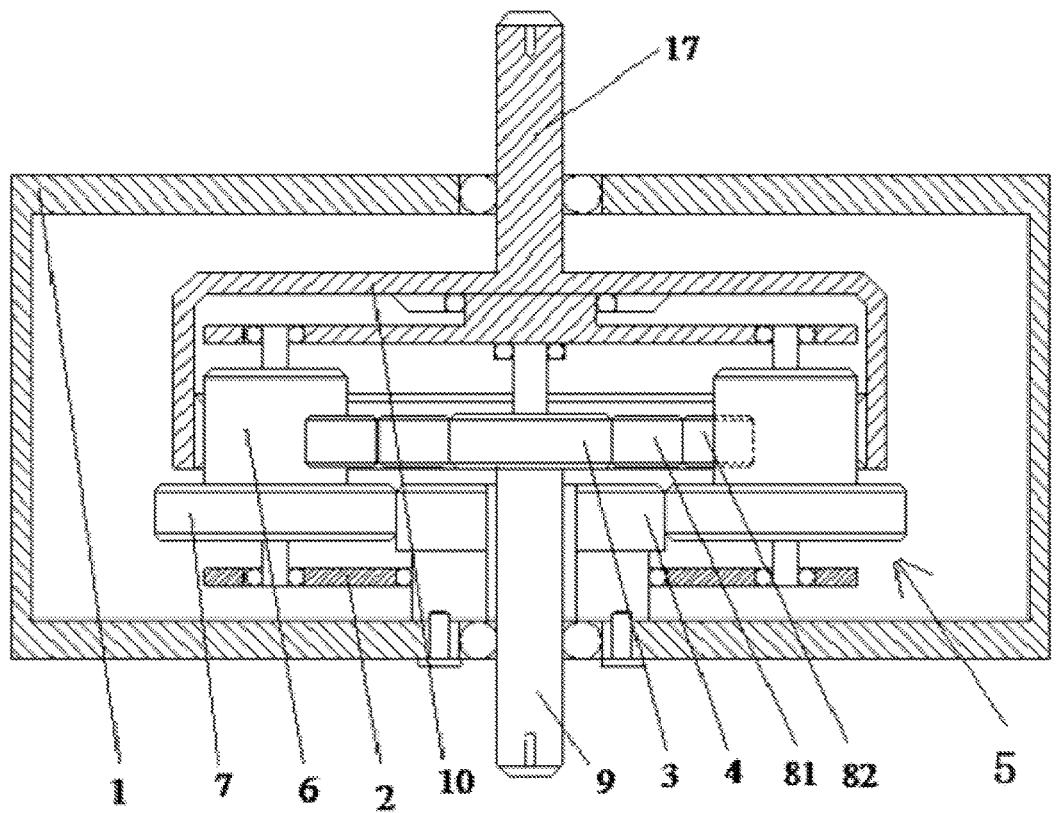
FIG. 26 is a sectional view of a gear-lever mechanism using meshing and pushing for rotation in an embodiment of the present invention where an output device is formed as gear ring output.
Figure 27:
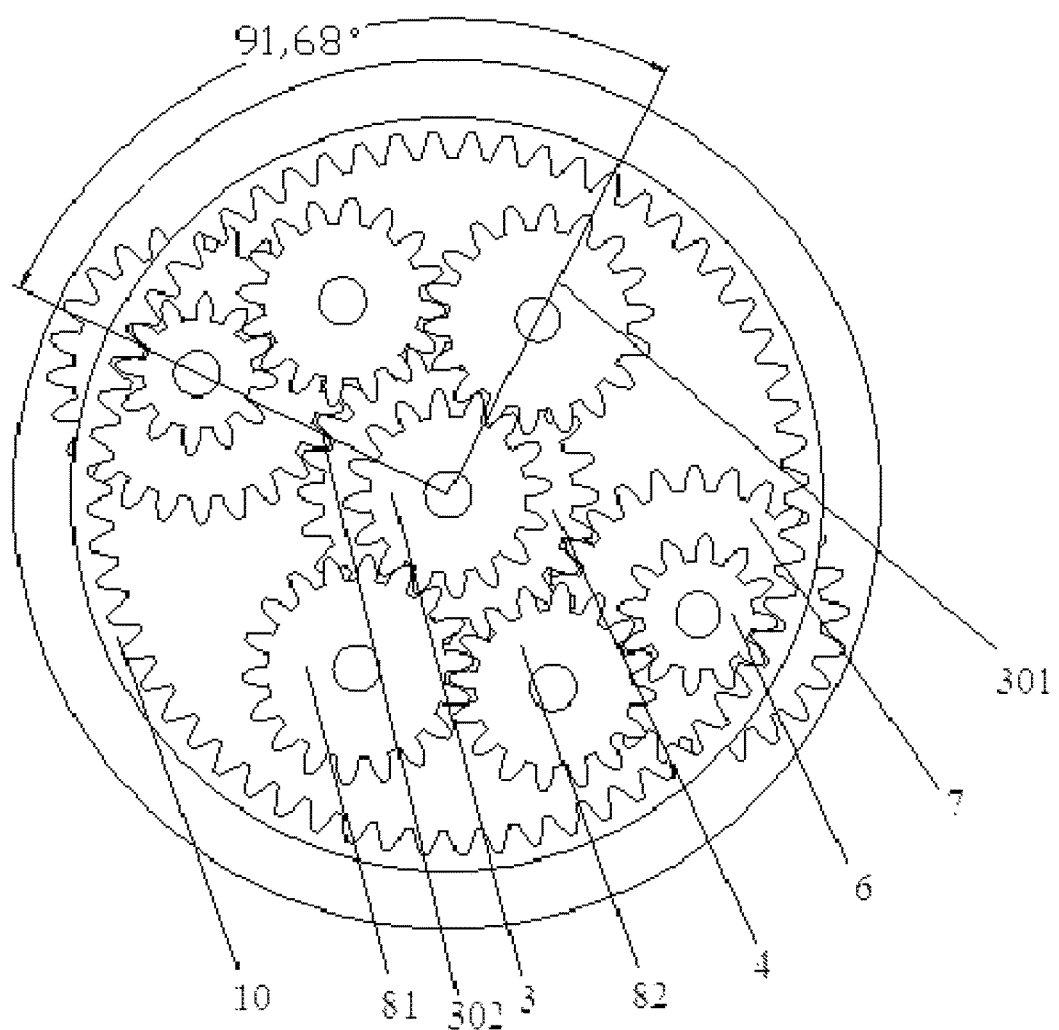
FIG. 27 is a top view of a gear-lever mechanism using meshing and pushing for rotation in an embodiment of the present invention where an output device is formed as gear ring output.

Referring to FIGS. 26 and 27, in comparison with the output manner of the supporting frame in Example 1, in addition to outputting using the supporting frame 2, a gear ring can also be disposed for output. It specifically comprises a shell 1, a supporting frame 2, a driving gear 3, a fixed bearing gear 4, a transfer-layer gear, an idler gear and an output gear ring 10, wherein the supporting frame 2 is disposed in the shell 1, the supporting frame 2 is rotatable relative to the shell 1, the supporting frame 2 is arranged coaxially with the fixed bearing gear 4, the supporting frame 2 is in sleeve joint with the fixed bearing gear 4, and the supporting frame 2 is rotatable about a shaft of the fixed bearing gear 4, one end of the fixed bearing gear 4 is fixedly connected to the shell 1, the driving gear 3 is connected with an input shaft 9, a first idler gear 81 and a second idler gear 82 are disposed at outside of the driving gear 3, and the driving gear 3 drives a transfer-layer gear part 6 of the transfer-layer gear 5 through the first idler gear 81 and the second idler gear 82. The transfer-layer gear 5 comprises an upper transfer-layer gear part 6 and a lower transfer-layer gear part 7 coaxially fixedly connected to each other, the upper transfer-layer gear part 6 and the lower transfer-layer gear part 7 moves in synchronism with each other, the lower transfer-layer gear part 7 of the transfer-layer gear 5 is meshed with the fixed bearing gear 4, the supporting frame 2 is coaxially covered with the output gear ring 10, the output gear ring 10 is an inner gear ring, inner teeth of the output gear ring 10 are meshed and connected with the upper transfer-layer gear part 6 of the transfer-layer gear 5, the output gear ring 10 is centrally connected with the input shaft 9, and an input torque is outputted by an output shaft 17 connected with the output gear ring 10.

It is to be noted that the tooth number of the upper transfer-layer gear part 6 of the transfer-layer gear 5 is not equal to the tooth number of the lower transfer-layer gear part 7, and a sum of the tooth number of the upper transfer-layer gear part 6 and the tooth number of the driving gear 3 is not equal to a sum of the tooth number of the lower transfer-layer gear part 7 and the tooth number of the fixed bearing gear 4.

As a preferred example, the diameter of the upper transfer-layer gear part 6 is smaller than the diameter of the lower transfer-layer gear part 7.

The gears (e.g., the idler gear, the driving gear, the transfer-layer gear, the fixed bearing gear) of the gear lever transmission mechanism are selected from herringbone gears, bevel gears, modified gears, involute gears, triangular gears, helical gears or spiral gears, but are not limited thereto and can be replaced and used equivalently.

The meshing point between the driving gear 3 and the first idler gear 81 is a driving point, the meshing point between the lower transfer-layer gear part 7 and the fixed bearing gear 4 is a bearing point, a connecting line from the axial center of the driving gear 3 to the driving point is a first straight line 301, a connecting line from the axial center of the fixed bearing gear 4 to the bearing point is a second straight line 302, and an angle formed between the first straight line 301 and the second straight line 302 is a thrust angle, which is 30 to 220°, and preferably 91.68° in the present solution.

As shown with reference to FIG. 31, the gears (e.g., the idler gear, the driving gear, the transfer-layer gear, the fixed bearing gear) used in the gear lever transmission mechanism are selected from herringbone gears, bevel gears, modified gears, involute gears, triangular gears, helical gears or spiral gears, but are not limited thereto and can be replaced and used equivalently.

The gear-lever mechanism of the present invention can be mounted or connected to a manual machine or a power machine for driving of vehicles, ships, and airplanes, power generation, or other circumstances where power output is required.

Example 8

Figure 28:
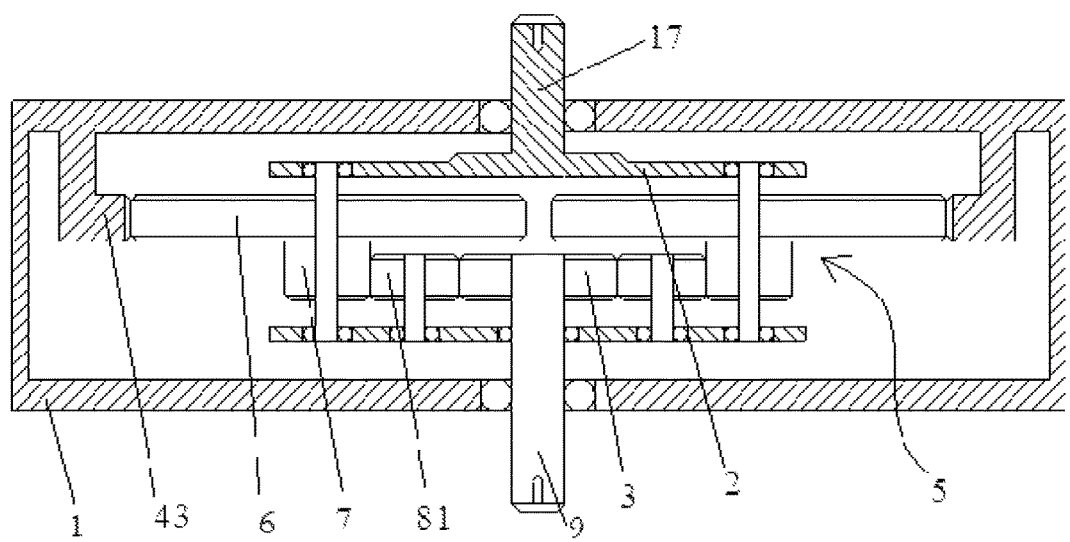
FIG. 28 is a sectional view of a gear-lever mechanism using meshing and pushing for rotation in an embodiment of the present invention where a positioning device is formed as a fixed gear ring.
Figure 29:
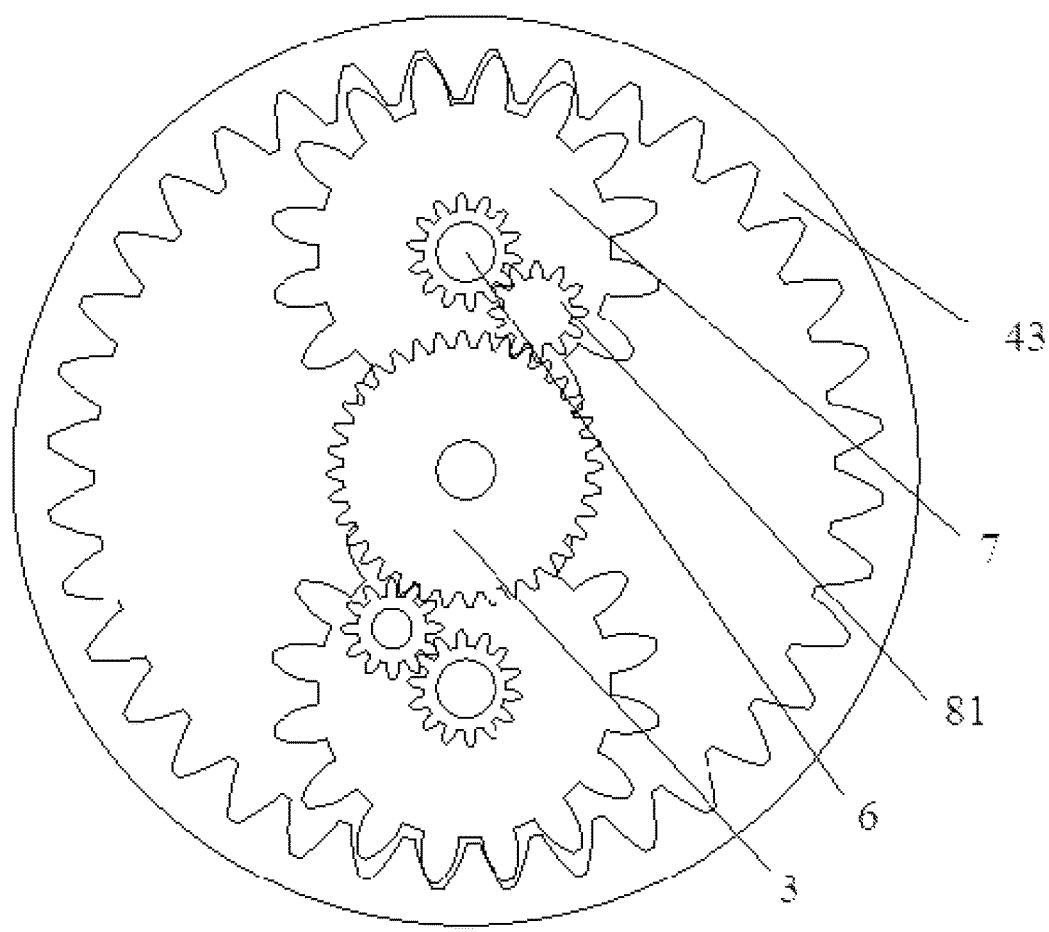
FIG. 29 is a top view of a gear-lever mechanism using meshing and pushing for rotation in an embodiment of the present invention where a positioning device is formed as a fixed gear ring.

As shown in FIGS. 28 and 29, in comparison with the solution in which the fixed bearing gear 4 is fixed at a center in Example 1, the fixed bearing gear 4 may be disposed in the form of a fixed gear ring 43, the details of which are as follows:

The shell 1 is provided with a supporting frame 2, the supporting frame 2 is rotatably connected with the shell 1, the supporting frame 2 is provided coaxially with a fixed gear ring 43, one end of the fixed gear ring 43 is fixedly connected to the shell 1, or inner teeth are disposed directly in the shell 1 to form a fixed gear ring 43, the driving gear 3 is coaxially connected with an input shaft 9, a first idler gear 81 is disposed at outside of the driving gear 3, the driving gear 3 drives a lower transfer-layer gear part 7 of a transfer-layer gear 5 through the first idler gear 81, the transfer-layer gear 5 comprises an upper transfer-layer gear part 6 and the lower transfer-layer gear part 7 coaxially fixedly connected with each other, the upper transfer-layer gear part 6 and the lower transfer-layer gear part 7 are rotated coaxially, and the upper transfer-layer gear part 6 of the transfer-layer gear 5 is meshed with the fixed gear ring 43.

An output shaft 17 is coaxially connected with the supporting frame 2, and an input torque is outputted by the output shaft 17 connected with the supporting frame 2 after passing through the driven gear set of the gear lever transmission mechanism.

It is to be noted that, in the present example, the tooth number of the upper transfer-layer gear part 6 of the transfer-layer gear 5 is not equal to the tooth number of the lower transfer-layer gear part 7, and a sum of the tooth number of the upper transfer-layer gear part 6 and the tooth number of the driving gear 3 is not equal to a sum of the tooth number of the lower transfer-layer gear part 7 and the tooth number of the positioning gear ring 43.

As a preferred example, the diameter of the upper transfer-layer gear part 6 is larger than the diameter of the lower transfer-layer gear part 7.

An odd number of idler gears may also be disposed between the upper transfer-layer gear part 6 and the fixed gear ring 43, or a plurality of idler gears are disposed and the plurality of idler gears are disposed in separate layers.

As a more preferred embodiment, two driven gear sets each constituted by the idler gears and the transfer-layer gears 5 are disposed in an annular array, centered around the driving gear 3, and the upper transfer-layer gear parts 6 of the transfer-layer gears 5 of the array simultaneously perform planetary meshing-pushing rotation in an inner ring of the positioning gear ring 43 to form two sets of meshing-pushing-lever-type power output paths for outputting to the outside.

In addition, two, three, or four sets of output devices including the idler gears and the transfer-layer gears 5 may also be disposed in an array, and the upper transfer-layer gear parts 6 of the transfer-layer gears 5 of the array simultaneously perform planetary meshing-pushing rotation in an inner ring of the positioning gear ring 43 to form at least two sets of meshing-pushing-lever-type power output paths for outputting to the outside.

It is to be noted that the idler gears of each of the driven gear sets may be disposed in an odd number such as 1, 3, 5, 7, or the like, and arranged outwardly in an arc shape along the circumference of the driving gear 3.

Speed ratio=output rotational speed: input rotational speed=the tooth number of the lower transfer-layer gear part 7*the tooth number of the driving gear 3/(the tooth number of the lower transfer-layer gear part 7*the tooth number of the driving gear 3−the tooth number of the upper transfer-layer gear part 6*the tooth number of the positioning gear ring 43).

Referring to FIG. 31, the gears (e.g., the idler gear, the driving gear, the transfer-layer gear, the fixed bearing gear) of the gear lever transmission mechanism are selected from herringbone gears, bevel gears, modified gears, involute gears, triangular gears, helical gears or spiral gears, but are not limited thereto and can be replaced and used equivalently. The gear-lever mechanism of the present invention can be mounted or connected to a manual machine or a power machine for driving of vehicles, ships, and airplanes, power generation, or other circumstances where power output is required.

Example 9

Figure 30:
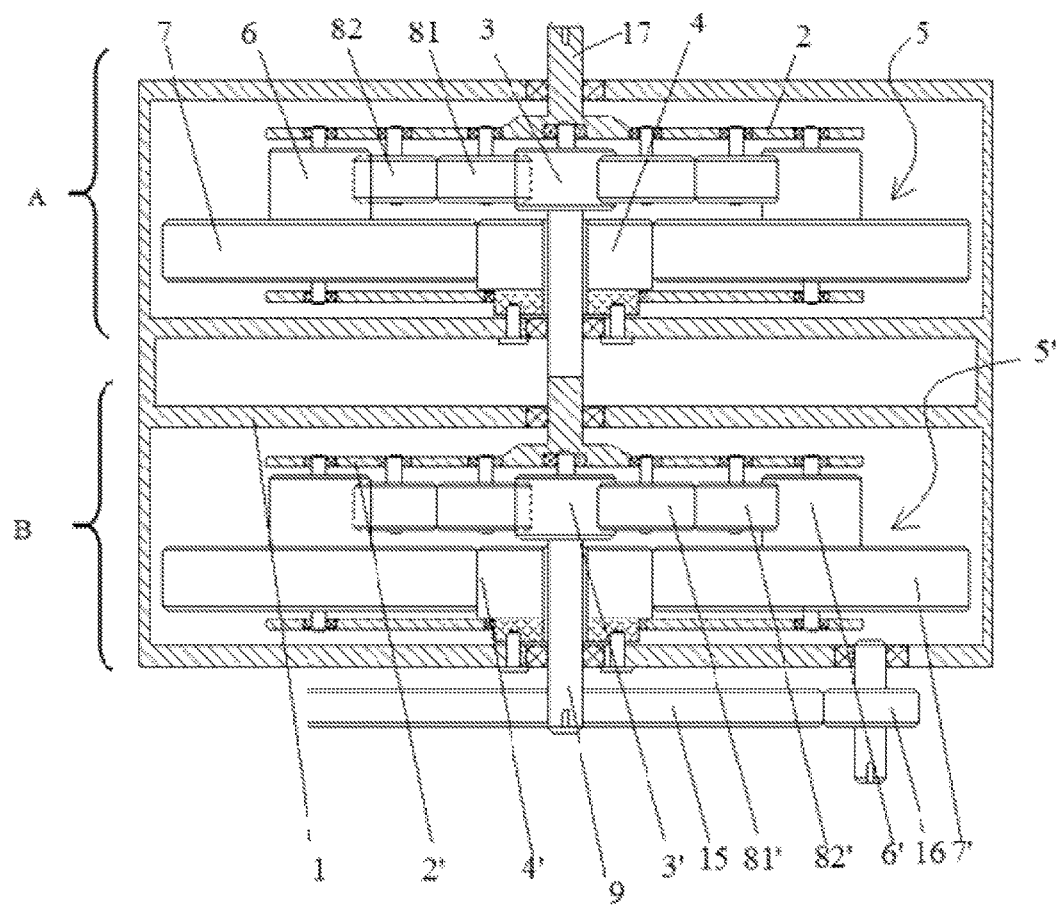
FIG. 30 is a section view showing an embodiment where multiple gear-lever mechanisms using meshing and pushing for rotation in an embodiment of the present invention are arranged in series and each additionally provided with a reduction gear construction.

Referring to FIG. 30, in comparison with Example 1, the present example is obtained by a coaxial superposition of two Examples in series in the vertical direction, the details of which are as follows:

The gear lever transmission mechanism comprises an upper-layer transmission structure A and a lower-layer transmission structure B. The upper-layer transmission structure A comprises a shell 1, a supporting frame 2, a driving gear 3, a fixed bearing gear 4, a transfer-layer gear 5 and an idler gear, the supporting frame 2 is disposed in the shell 1, the supporting frame 2 is rotatable relative to the shell 1, the supporting frame 2 is arranged coaxially with the fixed bearing gear 4, the supporting frame 2 is in sleeve joint with the fixed bearing gear 4, and the supporting frame 2 is rotatable about a shaft of the fixed bearing gear 4, one end of the fixed bearing gear 4 is fixedly connected to the shell 1, the driving gear 3 is connected with an input shaft 9, a first idler gear 81 and a second idler gear 82 are disposed at the outside of the driving gear 3, the driving gear 3 drives a transfer-layer gear part 6 of the transfer-layer gear 5 through the first idler gear 81 and the second idler gear 82, the transfer-layer gear 5 comprises an upper transfer-layer gear part 6 and a lower transfer-layer gear part 7 coaxially fixedly connected with each other, the upper transfer-layer gear part 6 and the lower transfer-layer gear part 7 move in synchronism with each other, and the lower transfer-layer gear part 7 of the transfer-layer gear 5 is meshed with the fixed bearing gear 4.

The lower-layer transmission structure B comprises a sub-supporting frame 2', a sub-driving gear 3', a sub-first idler gear 81', a sub-second idler gear 82', a sub-transfer-layer gear 5' constituted by a sub-upper transfer-layer gear part 6' and a sub-lower transfer-layer gear part 7', and a sub-fixed bearing gear 4', and the above members are connected and combined in the same manner as in the upper-layer transmission structure.

An output of the supporting frame of the lower-layer transmission structure B is connected to the input shaft of the upper-layer transmission structure, and is finally outputted by the output shaft 17 of the upper-layer transmission structure.

In order to facilitate the driving of the device, a reduction gear mechanism may be mounted at the input shaft 9 of the device, the reduction gear mechanism comprises a side input gear 16 and a main gear 15, the main gear 15 is coaxially connected with the input shaft, the side input gear 16 is disposed at a side of the main gear 15 and meshed therewith, and the main gear 15 is driven by the side input gear 16 to achieve a deceleration input.

Referring to FIG. 31, the gears (e.g., the idler gear, the driving gear, the transfer-layer gear, the fixed bearing gear) of the gear lever transmission mechanism are selected from and made of herringbone gears, bevel gears, modified gears, involute gears, triangular gears, helical gears or spiral gears, but are not limited thereto and can be replaced and used equivalently.

The gear-lever mechanism of the present invention can be mounted or connected to a manual machine or a power machine for driving of vehicles, ships, and airplanes, power generation, or other circumstances where power output is required.

The above description is merely illustrative of the embodiments of the present invention and is not intended to limit the scope of the present invention, and any equivalent structure or equivalent process variations made using the disclosure in the specification of the present invention, applied either directly or indirectly to other related technical fields, are to be covered within the scope of patent protection of the present invention.

The invention claimed is:

1. A gear-lever mechanism using meshing and pushing for rotation, comprising:
    a shell, an input device, an output device, and a positioning device housed by the shell,
    wherein the input device comprises at least one driving gear rotatably provided;
    the output device comprises at least one supporting frame in which several supporting shafts are disposed to support at least one movably rotatable driven gear set;
    the positioning device comprises at least one fixed bearing gear configured to form a rotational bearing point during rotation of the output device and be fixed by the shell;
    the driven gear set comprises a transfer-layer gear and at least one idler gear;
    the transfer-layer gear comprises an upper transfer-layer gear part and a lower transfer-layer gear part, a total tooth number of the upper transfer-layer gear part and one of the at least one driving gear is M, a total tooth number of the lower transfer-layer gear part and the fixed bearing gear is N, and M and N are configured to be unequal;
    the at least one idler gear or the transfer-layer gear meshed with the fixed bearing gear is configured to rotate in a direction same with the supporting frame at a speed higher than a rotation speed of the at least one driving gear;
    the driving gear is meshed with the upper transfer-layer gear part directly or through the at least one idler gear, and the lower transfer-layer gear part is meshed with the fixed bearing gear directly or through the idler gear, such that the driven gear set is able to perform planetary meshing-pushing rotation around the fixed bearing gear under driving by the driving gear, and to drive, through the supporting shafts, the supporting frame to rotate at the speed higher than the rotation speed of the at least one driving gear;
    a meshing point between the driving gear and the transfer-layer gear or each of the at least one idler gear is set as a driving point, a meshing point between the idler gear or the transfer-layer gear and the fixed bearing gear is set as a bearing point, and an intersection point formed by the supporting frame and the axial center of the outmost supporting shaft is set as an output force point; and an axial center of the supporting shaft of each of driven gears in the driven gear set of the output device is a sub-bearing point, wherein each of the driven gears is meshed with the adjacent driven gears to respectively form two meshing points, the bearing point and the two meshing points form a triangular pushing area, and at least two triangular pushing areas connected from head to tail form a meshing-pushing-lever-type torsion output path from the driving gear to the fixed bearing gear for connection in a bent form and driving.

2. The gear-lever mechanism using meshing and pushing for rotation according to claim 1, wherein the supporting frame is configured to support at least two movably rotatable driven gear sets by several supporting shafts, with the at least two driven gear sets being disposed axially symmetrically with respect to the driving gear.

3. The gear-lever mechanism using meshing and pushing for rotation according to claim 1, wherein the supporting frame is configured to support at least three movably rotatable driven gear sets by several supporting shafts, with the driven gear sets being disposed centrally symmetrically with respect to the supporting shaft of the driving gear.

4. The gear-lever mechanism using meshing and pushing for rotation according to claim 1, wherein each of the driven gear sets comprises an even number of idler gears.

5. The gear-lever mechanism using meshing and pushing for rotation according to claim 4, wherein the idler gears are in number of two, four, six or eight.

6. The gear-lever mechanism using meshing and pushing for rotation according to claim 1, wherein each of the driven gear sets comprises an odd number of idler gears.

7. The gear-lever mechanism using meshing and pushing for rotation according to claim 6, wherein the idler gears are in number of one, three, five or seven.

8. The gear-lever mechanism using meshing and pushing for rotation according to claim 1, wherein each of the driven gear sets is provided with at least one transfer-layer gear.

9. The gear-lever mechanism using meshing and pushing for rotation according to claim 8, wherein each of the driven gear sets is provided with at least two transfer-layer gears.

10. The gear-lever mechanism using meshing and pushing for rotation according to claim 1, wherein tooth number of the upper transfer-layer gear part is configured to be equal to tooth number of the lower transfer-layer gear part, and tooth number of the driving gear is configured to be unequal to tooth number of the fixed bearing gear.

11. The gear-lever mechanism using meshing and pushing for rotation according to claim 1, wherein tooth number of the upper transfer-layer gear part is configured to be unequal to tooth number of the lower transfer-layer gear part, and tooth number of the driving gear is configured to be equal to tooth number of the fixed bearing gear.

12. The gear-lever mechanism using meshing and pushing for rotation according to claim 1, wherein tooth number of the upper transfer-layer gear part is configured to be unequal to tooth number of the lower transfer-layer gear part, and tooth number of the driving gear is configured to be unequal to tooth number of the fixed bearing gear.

13. The gear-lever mechanism using meshing and pushing for rotation according to claim 1, wherein difference between tooth number of the upper transfer-layer gear part and tooth number of the lower transfer-layer gear part is at least two.

14. The gear-lever mechanism using meshing and pushing for rotation according to claim 13, wherein difference between the tooth number of the upper transfer-layer gear part and the tooth number of the lower transfer-layer gear part is four, six, eight, twelve or at least eighteen.

15. The gear-lever mechanism using meshing and pushing for rotation according to claim 1, wherein difference between the tooth number of the driving gear and the tooth number of the fixed bearing gear is at least two.

16. The gear-lever mechanism using meshing and pushing for rotation according to claim 15, wherein difference between the tooth number of the driving gear and the tooth number of the fixed bearing gear is at least four, six, eight, twelve or at least eighteen.

17. The gear-lever mechanism using meshing and pushing for rotation according to claim 1, wherein the several idler gears are arranged in a same layer.

18. The gear-lever mechanism using meshing and pushing for rotation according to claim 1, wherein the several idler gears are not arranged in a same layer.

19. The gear-lever mechanism using meshing and pushing for rotation according to claim 1, wherein the meshing-pushing-lever-type power output path is in an involute, arcuate or polyline shape.

20. The gear-lever mechanism using meshing and pushing for rotation according to claim 1, wherein the output device and the driving gear are configured to rotate in a same direction when a sum of the tooth number of the upper transfer-layer gear part and the tooth number of the driving gear is larger than a sum of the tooth number of the lower transfer-layer gear part and the tooth number of the fixed bearing gear; and the output device and the driving gear are configured to rotate in reverse directions when the sum of the tooth number of the upper transfer-layer gear part and the tooth number of the driving gear is smaller than the sum of the tooth number of the lower transfer-layer gear part and the tooth number of the fixed bearing gear.

21. The gear-lever mechanism using meshing and pushing for rotation according to claim 1, wherein the idler gear is disposed between the driving gear and the transfer-layer gear or disposed only between the transfer-layer gear and the fixed bearing gear.

22. The gear-lever mechanism using meshing and pushing for rotation according to claim 1, wherein the output device further comprises an inner gear ring meshed with the transfer-layer gear or the idler gear.

23. The gear-lever mechanism using meshing and pushing for rotation according to claim 1, wherein the driving gear, the idler gear, the transfer-layer gear, or the fixed bearing gear includes a herringbone gear, a bevel gear, a modified gear, an involute gear, a triangular gear, a helical gear, or a spiral gear.

24. The gear-lever mechanism using meshing and pushing for rotation according to claim 1, wherein the driving gear is a roller gear.

25. The gear-lever mechanism using meshing and pushing for rotation according to claim 1, wherein the positioning device is set as a fixed gear ring.

26. The gear-lever mechanism using meshing and pushing for rotation according to claim 1, wherein at least two triangular pushing areas are formed in one of the driven gear sets.

27. The gear-lever mechanism using meshing and pushing for rotation according to claim 26, wherein the formed triangular pushing areas are in number of two, three, four, five, six or seven.

28. The gear-lever mechanism using meshing and pushing for rotation according to claim 1, wherein a vertex angle of the triangular pushing area to which the sub-bearing point belongs is less than or equal to 170 degrees.

29. The gear-lever mechanism using meshing and pushing for rotation according to claim 28, wherein the vertex angle of the triangular pushing area to which the sub-bearing point belongs is less than or equal to 120 degrees.

30. The gear-lever mechanism using meshing and pushing for rotation according to claim 28, wherein the vertex angle of the triangular pushing area to which the sub-bearing point belongs is between 25 degrees and 60 degrees.

31. The gear-lever mechanism using meshing and pushing for rotation according to claim 1, further comprising two or more gear-lever mechanisms each configured to achieve transmission by a reduction gear mechanism.

32. The gear-lever mechanism using meshing and pushing for rotation according to claim 31, wherein a plurality of gear-lever mechanisms are disposed coaxially concentrically in series in a vertical direction.

33. The gear-lever mechanism using meshing and pushing for rotation according to claim 31, wherein a plurality of gear-lever mechanisms are in staggered arrangement in a vertical direction.

34. The gear-lever mechanism using meshing and pushing for rotation according to claim 1, wherein the shells of the plurality of gear-lever mechanisms are disposed in one piece.

35. The gear-lever mechanism using meshing and pushing for rotation according to claim 1, wherein a first straight line is formed from an axial center of the driving gear to the driving point, a second straight line is formed from an axial center of the fixed bearing gear to the bearing point, and an angle between the first straight line and the second straight line forms a thrust angle which is of 30 degrees to 220 degrees.

36. The gear-lever mechanism using meshing and pushing for rotation according to claim 35, wherein the thrust angle is of 59 degrees to 135 degrees.

37. The gear-lever mechanism using meshing and pushing for rotation according to claim 35, wherein the thrust angle is of 73 degrees to 92 degrees.

38. The gear-lever mechanism using meshing and pushing for rotation according to claim 1, wherein at least one end portion of the supporting shaft is provided with a rotatable part.

39. The gear-lever mechanism using meshing and pushing for rotation according to claim 38, wherein the supporting shaft is fixedly connected in the supporting frame, and the idler gear and the transfer-layer gear in the driven gear set are rotatably sheathed on the supporting shaft.

40. The gear-lever mechanism using meshing and pushing for rotation according to claim 38, wherein the supporting shaft is embodied as a shaft-like protrusion protruding from an inner side of the supporting frame.

41. The gear-lever mechanism using meshing and pushing for rotation according to claim 38, wherein the supporting shaft is a shaft connected with the supporting frame.

42. The gear-lever mechanism using meshing and pushing for rotation according to claim 38, wherein the rotatable part includes a cylindrical roller bearing, a tapered roller bearing, a ball bearing or a sliding sleeve.

\* \* \* \* \*